US012709349B2

(12) United States Patent
Bourque et al.

(10) Patent No.: US 12,709,349 B2
(45) Date of Patent: Aug. 18, 2026

(54) ELECTRIC VEHICLE WITH AN ELECTRIC POWERPACK ARRANGEMENT

(71) Applicant: BOMBARDIER RECREATIONAL PRODUCTS INC., Valcourt (CA)

(72) Inventors: Yannick Bourque, St-Denis-de-Brompton (CA); Thomas Driant, Saint-Francois-Xavier-de-Brompton (CA); Jean Guillemette, Valcourt (CA); Jonathan Fortier, Lawrenceville (CA); Alexandre Vachon, Sherbrooke (CA); Alexandre Leclair, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 297 days.

(21) Appl. No.: 18/704,600

(22) PCT Filed: Oct. 31, 2022

(86) PCT No.: PCT/IB2022/060483

§ 371 (c)(1),
(2) Date: Apr. 25, 2024

(87) PCT Pub. No.: WO2023/073665

PCT Pub. Date: May 4, 2023

(65) Prior Publication Data

US 2025/0276756 A1 Sep. 4, 2025

Related U.S. Application Data

(60) Provisional application No. 63/273,435, filed on Oct. 29, 2021, provisional application No. 63/273,468, filed on Oct. 29, 2021.

(51) Int. Cl.
*B62J 43/16* (2020.01)
*B62M 7/04* (2006.01)
*B62M 27/02* (2006.01)

(52) U.S. Cl.
CPC ................ *B62J 43/16* (2020.02); *B62M 7/04* (2013.01); *B62M 27/02* (2013.01)

(58) Field of Classification Search
CPC ........................................................ B62J 43/16
See application file for complete search history.

(56) References Cited

U.S. PATENT DOCUMENTS 8,672,077 B2 3/2014 Sand et al.
8,897,959 B1 11/2014 Sweney et al.
(Continued)

FOREIGN PATENT DOCUMENTS

CN 112977694 A 6/2021
CN 118323308 A 7/2024
(Continued)

OTHER PUBLICATIONS

Partial supplementary European search report issued on Jul. 1, 2025, during the prosecution of corresponding application 22886296.7.

*Primary Examiner* — Kevin Hurley
(74) *Attorney, Agent, or Firm* — BCF LLP

(57) ABSTRACT

A straddle seat electric vehicle including an electric motor and an electric powerpack including a battery pack including a battery housing including a housing body, a cooling channel extending generally vertically through a center portion of the housing body, two covers selectively connected to the housing body; a plurality of cylindrical battery cells disposed in a two chambers defined by the housing laterally between the cooling channel and the first cover, each battery cell of the first plurality of battery cells extending generally orthogonally to the cooling channel and the first cover; one or more current collectors electrically con- (Continued)

nected to the first plurality of battery cells, the covers enclosing the current collectors and outer ends of the battery cells being electrically insulated from the at least one first current collector.

20 Claims, 21 Drawing Sheets

(56) References Cited

U.S. PATENT DOCUMENTS

| | | | | |
|---|---|---|---|---|
| 9,193,411 | B2 | 11/2015 | Sand et al. | |
| 9,403,574 | B2 | 8/2016 | Sand et al. | |
| 9,415,673 | B2 | 8/2016 | Blain et al. | |
| 9,446,659 | B1 | 9/2016 | Blain et al. | |
| 9,941,556 | B2 | 4/2018 | Testoni | |
| 10,008,704 | B2 | 6/2018 | Sweney et al. | |
| 10,559,797 | B2 | 2/2020 | Sweney et al. | |
| 10,658,646 | B2 * | 5/2020 | Capati | H01M 50/507 |
| 10,787,219 | B2 | 9/2020 | Oba | |
| 12,552,483 | B2 * | 2/2026 | Bourque | B60K 1/00 |
| 2013/0244069 | A1 | 9/2013 | Horii et al. | |
| 2013/0270038 | A1 | 10/2013 | Nitta | |
| 2013/0270938 | A1 | 10/2013 | Matsuda | |
| 2014/0234668 | A1 | 8/2014 | Sweney et al. | |
| 2014/0234683 | A1 | 8/2014 | Sweney | |
| 2014/0234686 | A1 | 8/2014 | Sweney et al. | |
| 2015/0008061 | A1 | 1/2015 | Matsuda | |
| 2015/0122563 | A1 | 5/2015 | Kondo et al. | |
| 2015/0314830 | A1 | 11/2015 | Inoue | |
| 2016/0068224 | A1 | 3/2016 | Rasmussen | |
| 2016/0240900 | A1 * | 8/2016 | Testoni | H01M 50/209 |
| 2016/0268655 | A1 | 9/2016 | Takamatsu et al. | |
| 2017/0129570 | A1 | 5/2017 | Mangum et al. | |
| 2017/0288285 | A1 | 10/2017 | Buckhout et al. | |
| 2018/0254536 | A1 | 9/2018 | Chidester et al. | |
| 2020/0031420 | A1 | 1/2020 | Aunkst et al. | |
| 2020/0130498 | A1 | 4/2020 | Matsushima et al. | |
| 2025/0364633 | A1 * | 11/2025 | Driant | H01M 10/667 |

FOREIGN PATENT DOCUMENTS

| | | | | |
|---|---|---|---|---|
| EP | 2280436 | A2 | 2/2011 | |
| EP | 4438361 | A1 | 10/2024 | |
| WO | 2019096680 | A1 | 5/2019 | |
| WO | 2019/186749 | A1 | 12/2020 | |
| WO | WO-2024095094 | A1 * | 5/2024 | H01M 50/244 |
| WO | WO-2024246752 | A1 * | 12/2024 | H01M 10/6555 |

* cited by examiner 11
134
137
132
160
278
118
118
116
116
200
210
250
285
285
284
282
280
287
287
114
114
270, 272
112
11

ELECTRIC VEHICLE WITH AN ELECTRIC POWERPACK ARRANGEMENT

CROSS-REFERENCE

The present application claims priority from U.S. Provisional Patent Application No. 63/273,435, entitled "Electric Vehicle with a Cooling Arrangement," filed Oct. 29, 2021, and to U.S. Provisional Patent Application No. 63/273,468, entitled "Electric Vehicle with an Electric Powerpack Arrangement," filed Oct. 29, 2021, the entirety of both of which is incorporated by reference herein.

FIELD OF TECHNOLOGY

The present technology relates to vehicles having electric powerpack arrangements, specifically straddle-seat electric vehicles.

BACKGROUND

Straddle seat vehicles, including motorcycles, all-terrain vehicles, and snowmobiles, are popular transport and recreational vehicles. As the move toward electrification of vehicles progresses, interest in electric versions of straddle seat vehicles increases.

For the case of straddle seat vehicles, space available for different electric components, including at least a battery assembly, charging components, an electric motor, and components for managing power distribution, is strictly limited. Mounting the components of an electric powerpack in a spatially efficient manner, while still providing convenient access for maintenance, thus remains a challenge.

There is therefore a desire for powerpack arrangements for electric straddle seat vehicles addressing at least some of the above described disadvantages.

SUMMARY

It is an object of the present technology to ameliorate at least some of the inconveniences present in the prior art.

According to one aspect of the present technology, there is provided an electric vehicle with a powerpack arrangement to arrange battery components in an efficient manner while maintaining access to different components for ease of maintenance. The battery pack is formed from battery modules including a plurality of battery cells connected in series. Each module has a battery management system, and each battery management system is connected to a global battery management system disposed in the battery pack. The battery housing also includes a battery cooling channel defined through a center thereof. The cooling channel is fluidly connected to a liquid cooling system of the vehicle, permitting the battery cells to be cooled during operation while maintaining an efficient spatial arrangement of the battery pack. The electric powerpack further includes an inverter and a charger mounted directly to the battery pack to further minimize the spatial footprint of the powerpack.

According to one aspect of the present technology, there is provided a straddle seat electric vehicle including a frame; a straddle seat supported by the frame; at least one ground-engaging member operatively connected to the frame; an electric motor being operatively connected to the at least one ground-engaging member for driving the at least one ground-engaging member; an electric powerpack operatively connected to the electric motor, the powerpack including a battery pack including a battery housing including a housing body, a cooling channel defined in the housing body, the cooling channel extending generally vertically through a center portion of the housing body, a first cover selectively connected to the housing body, and a second cover selectively connected to the housing body; a first plurality of cylindrical battery cells disposed in a first chamber defined by the housing laterally between the cooling channel and the first cover, each battery cell of the first plurality of battery cells extending generally orthogonally to the cooling channel and the first cover; at least one first current collector disposed laterally between the first cover and the first plurality of battery cells, the at least one first current collector being electrically connected to the first plurality of battery cells, the first cover enclosing the at least one first current collector and outer ends of the battery cells of the first plurality of battery cells, the first cover being electrically insulated from the at least one first current collector; a second plurality of cylindrical battery cells disposed in a second chamber defined by the housing laterally between the cooling channel and the second cover, each battery cell of the second plurality of battery cells extending generally orthogonally to the cooling channel and the second cover; and at least one second current collector disposed laterally between the second cover and the second plurality of battery cells, the at least one second current collector being electrically connected to the second plurality of battery cells, the second cover enclosing the at least one second current collector and outer ends of the battery cells of the second plurality of battery cells, the second cover being electrically insulated from the at least one second current collector.

In some embodiments, the battery cells of the first plurality of battery cells are separated into a first plurality of battery modules; the at least one first current collector includes a first plurality of current collectors connected in series; each one of the first plurality of current collectors is electrically connected to a corresponding battery module of the first plurality of battery modules; the battery cells of the second plurality of battery cells is separated into a second plurality of battery modules; the at least one second current collector includes a second plurality of current collectors connected in series; and each one of the second plurality of current collectors is electrically connected to a corresponding battery module of the second plurality of battery modules.

In some embodiments, the second plurality of battery modules has a greater number of battery modules than the first plurality of battery modules.

In some embodiments, the first plurality of battery modules includes three first battery modules disposed in the first chamber; the first plurality of current collectors includes three first current collectors; the second plurality of battery modules includes four second battery modules disposed in the second chamber; and the second plurality of current collectors includes four second current collectors.

In some embodiments, the three first current collectors are electrically connected to one another in series; and the four second current collectors are electrically connected to one another in series.

In some embodiments, the first plurality of current collectors is a first plurality of printed circuit boards (PCBs); and the second plurality of current collectors is a second plurality of PCBs.

In some embodiments, each PCB of the first and second pluralities of PCBs includes a module battery management system (BMS) for managing the corresponding battery module of the first and second pluralities of battery modules.

In some embodiments, the battery pack further includes at least one of a global BMS disposed in the first chamber, the global BMS being electrically connected to the at least one first current collector and the at least one second current collector; and a DC-DC converter disposed in the first chamber, the DC-DC converter being electrically connected to at least one of the at least one first current collector and the at least one second current collector.

In some embodiments, the electric powerpack further comprises a plurality of electrical components; at least one of the plurality of electrical components being electrically connected to the first and second pluralities of cylindrical battery cells and disposed on an exterior of the battery housing; and at least one other of the plurality of electrical components being electrically connected to the first and second pluralities of cylindrical battery cells and disposed on an interior of the battery housing.

In some embodiments, the electric powerpack further includes at least one of a charger electrically connected to the first and second pluralities of cylindrical battery cells; and an inverter electrically connected to the first and second pluralities of cylindrical battery cells.

In some embodiments, the electric powerpack comprises both the charger and the inverter.

In some embodiments, the charger and the inverter are mounted to the battery housing.

In some embodiments, the housing body includes a first lateral portion, and a second lateral portion connected to the first lateral portion; the first cover being selectively connected to the first lateral portion; the second cover being selectively connected to the second lateral portion; an inner face of the first lateral portion including a first channel form; an inner face of the second lateral portion including a second channel form; the cooling channel is defined by a space created between the inner face of the first lateral portion and the inner face of the second lateral portion; and the center portion of the housing body being formed by an inner part of the first lateral portion and an inner part of the second lateral portion.

In some embodiments, the battery pack further includes at least one first dielectric layer disposed between inner ends of the first plurality of battery cells and the center portion the housing body; and at least one second dielectric layer disposed between inner ends of the second plurality of battery cells and the center portion the housing body.

In some embodiments, when in operation, coolant flowing through the cooling channel absorbs heat from inner ends of the first plurality of battery cells and inner ends of the second plurality of battery cells.

In some embodiments, inner ends of the first plurality of battery cells are in thermal communication with the cooling channel through the housing body; and inner ends of the second plurality of battery cells are in thermal communication with the cooling channel through the housing body.

In some embodiments, the vehicle further includes a liquid cooling system including a fluid pump; a coolant reservoir; and a cooling circuit formed at least in part by the cooling channel of the battery housing, the cooling channel being fluidly connected to the fluid pump and the coolant reservoir.

In some embodiments, the at least one ground-engaging member includes a front wheel disposed at least in part forward of the powerpack, and a rear wheel disposed at least in part rearward of the powerpack; and the vehicle is an electric motorcycle.

In some embodiments, the vehicle is an electric snowmobile and the at least one ground-engaging member includes two skis.

According to another aspect of the present technology, there is provided a straddle seat electric vehicle including a frame; a straddle seat supported by the frame; at least one ground-engaging member operatively connected to the frame; an electric motor being operatively connected to the at least one ground-engaging member for driving the at least one ground-engaging member; an electric powerpack operatively connected to the electric motor, the powerpack including a battery pack including a battery housing including a housing body, a cooling channel defined in the housing body, the cooling channel extending generally vertically through a center portion of the housing body, a first cover selectively connected to the housing body, and a second cover selectively connected to the housing body; a first plurality of battery modules disposed in a first chamber defined by the housing laterally between the cooling channel and the first cover, each module of the first plurality of battery modules including a plurality of battery cells; a plurality of first current collectors disposed laterally between the first cover and the first plurality of battery modules, each battery module of the first plurality of battery modules being operatively connected to a corresponding one of the first plurality of current collectors, the plurality of battery cells of each battery module of the first plurality of battery modules being connected together in series by the corresponding one of the first plurality of current collectors; a second plurality of battery modules disposed in a second chamber defined by the housing laterally between the cooling channel and the second cover, each module of the second plurality of battery modules including a plurality of battery cells; and a plurality of second current collectors disposed laterally between the second cover and the second plurality of battery modules, each battery module of the second plurality of battery modules being operatively connected to a corresponding one of the second plurality of current collectors, the plurality of battery cells of each battery module of the second plurality of battery modules being connected together in series by the corresponding one of the second plurality of current collectors.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
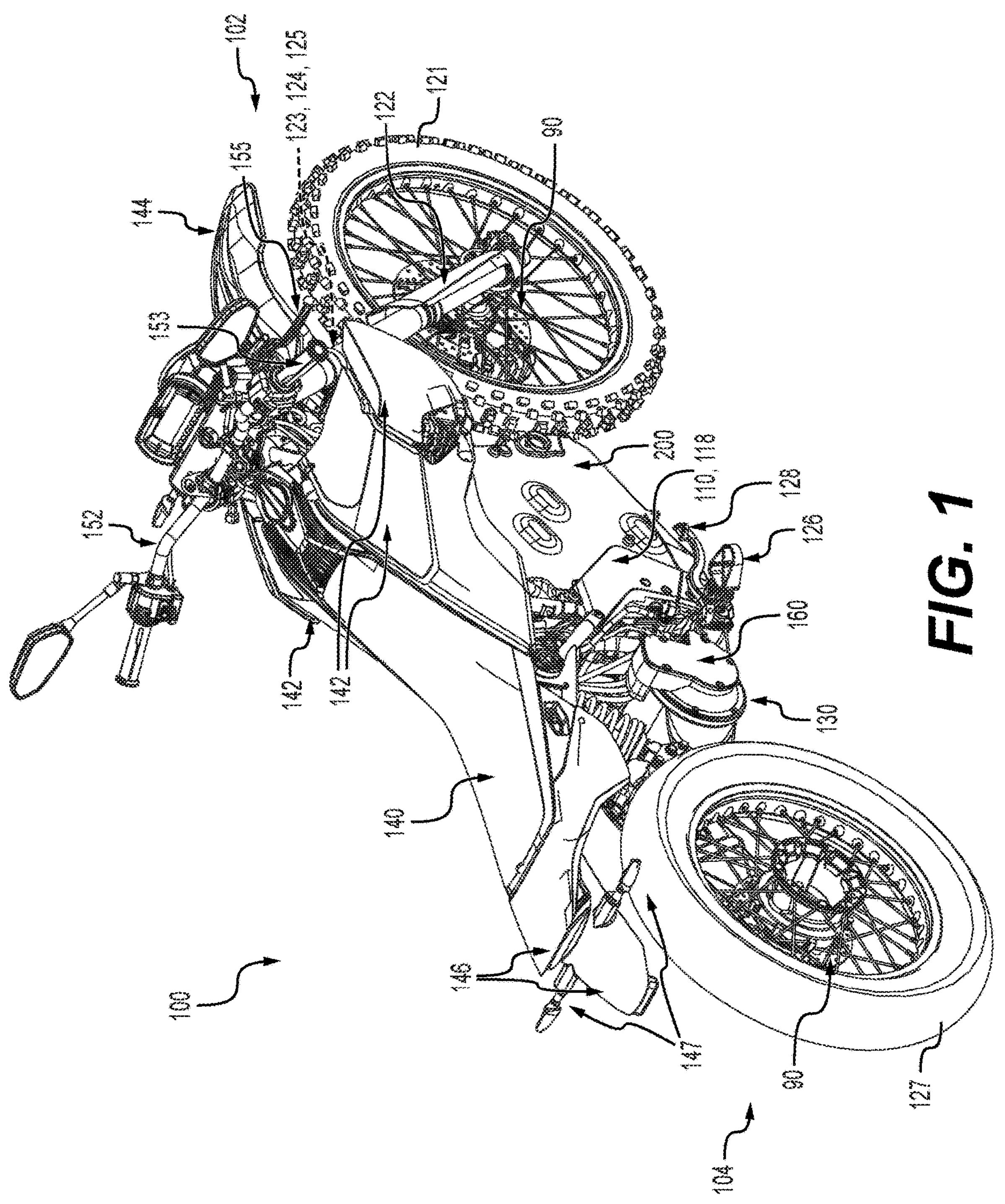
FIG. 1 is a top, rear, right side perspective view of an electric motorcycle according to a non-limiting embodiment of the present technology.

It should be noted that, unless otherwise explicitly specified herein, the drawings are not necessarily to scale.

DETAILED DESCRIPTION

The present technology will be described herein with respect to a straddle-seat electric vehicles, specifically a two-wheeled electric motorcycle 100 and an electric snowmobile 300. Aspects of the present technology could also be implemented in different straddle-seat electric vehicles, such as three-wheeled electric vehicles and all-terrain vehicles (ATVs).

While the motorcycle 100 illustrated herein is a trail style electric motorcycle 100, it is contemplated that motorcycles according to the present technology could vary by a plurality of vehicle characteristics. These vehicle characteristics could include, but are not limited to, a rider posture configuration (also referred to as a rider position), a motorcycle type, tire type, a wheelbase, a steering arrangement, a weight distribution, a squat ratio, a rake angle, a seat height, and a mechanical trail. The rider posture configuration, or rider position, is the relative spacing and position of a rider's hands (when holding the handlebars), the rider's feet (when positioned on the footrests) and the rider's buttocks (when the rider is seated on a seat of the motorcycle). The steering arrangement could also vary and can be described by a variety of parameters, including but not limited to: a length of front suspension travel, a length of rear suspension travel, a front suspension stiffness, a rear suspension stiffness, a front and/or rear wheel size, rake angle, mechanical trail, triple clamp offset, squat ratio, and wheel base.

With reference to FIGS. 1 to 5, the electric motorcycle 100, referred to herein as the vehicle 100, has a front end 102, a rear end 104, and a longitudinal centerplane 103 defined consistently with the forward travel direction of the vehicle 100.

Figure 6:
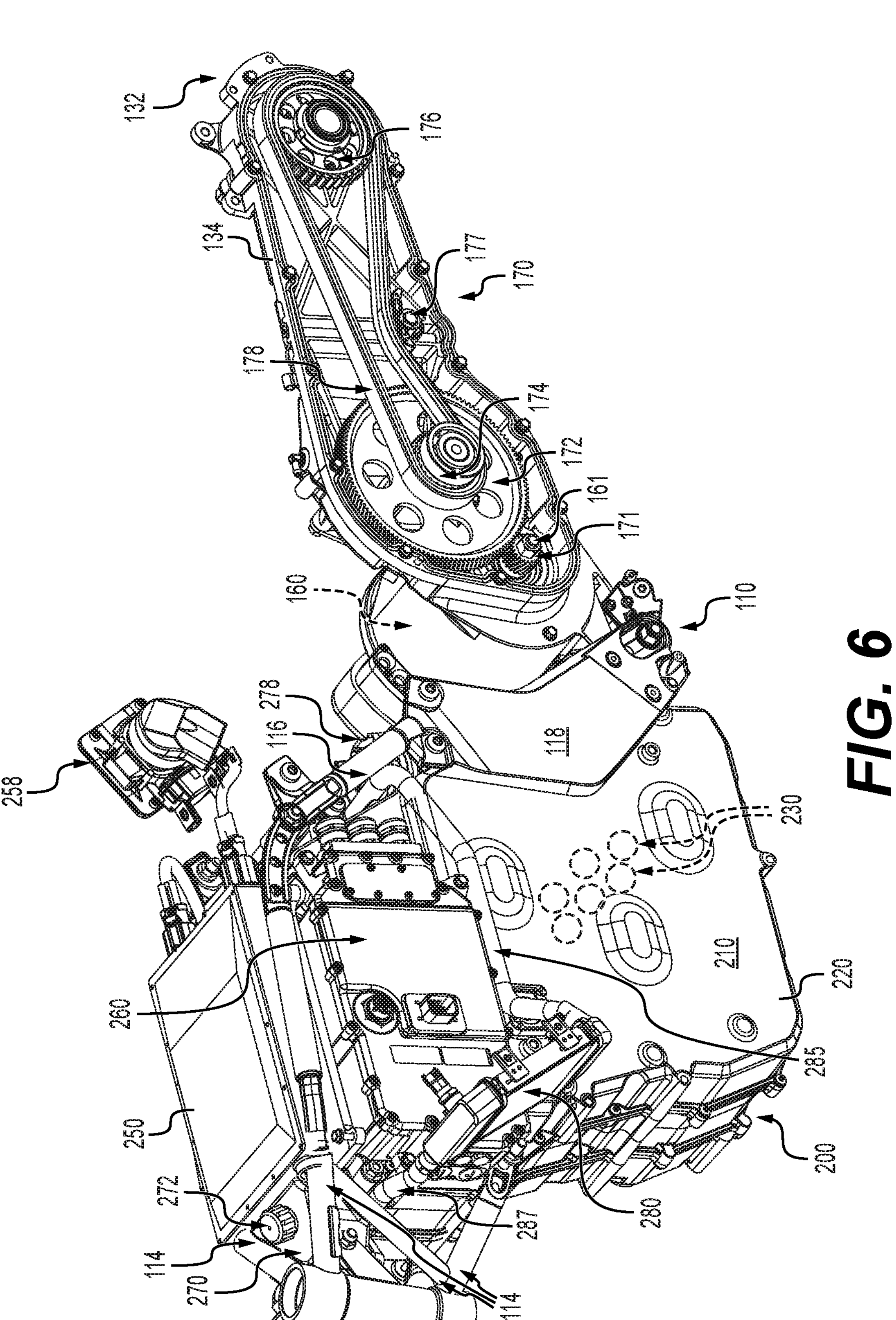
FIG. 6 is a top, front, left side perspective view of a frame, a powerpack, a drivetrain, and a swing arm of the vehicle of claim 1, with a housing cover of the swing arm having been removed.
Figure 7:
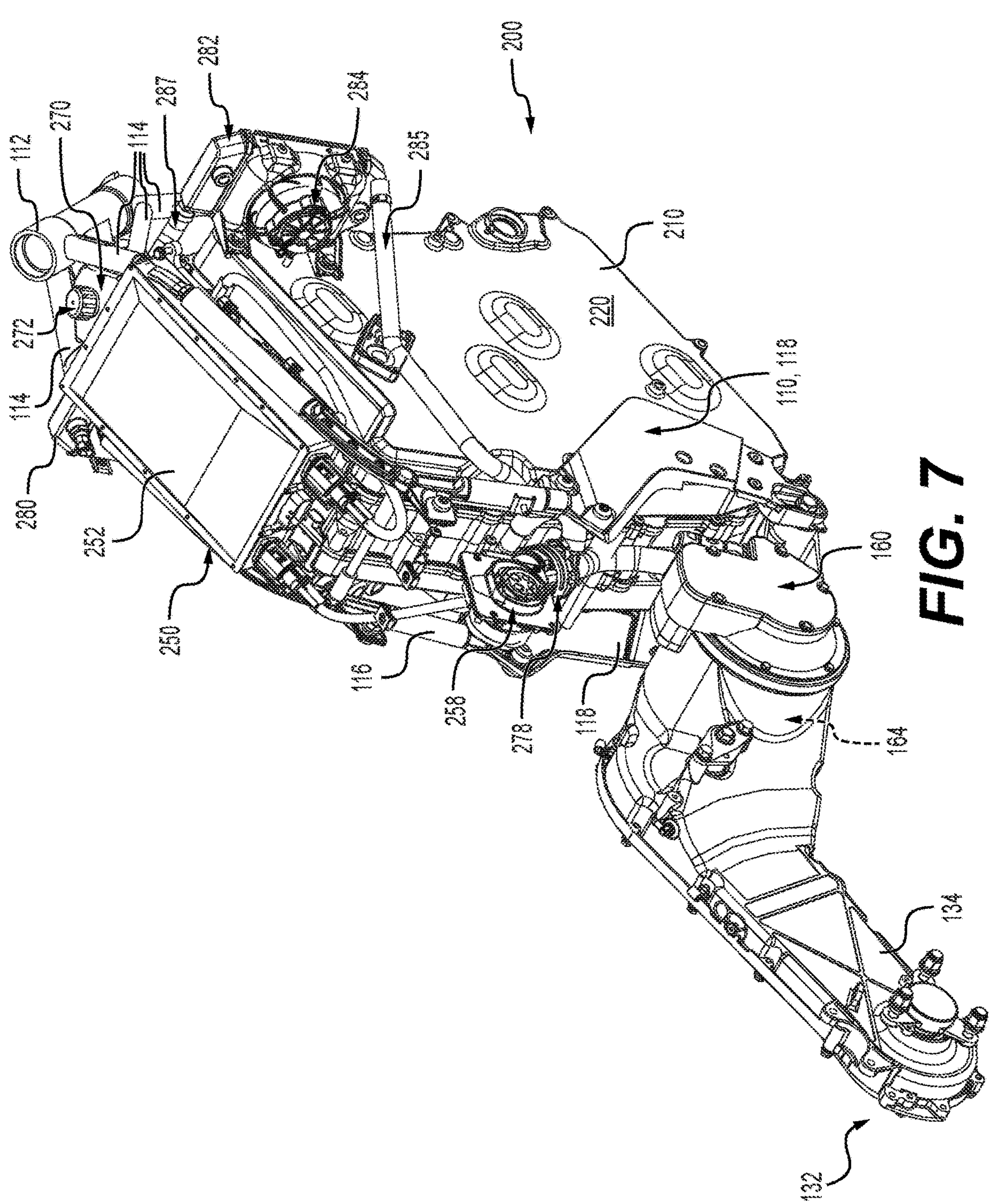
FIG. 7 is a top, rear, right side perspective view of the components of FIG. 6.
Figure 8:
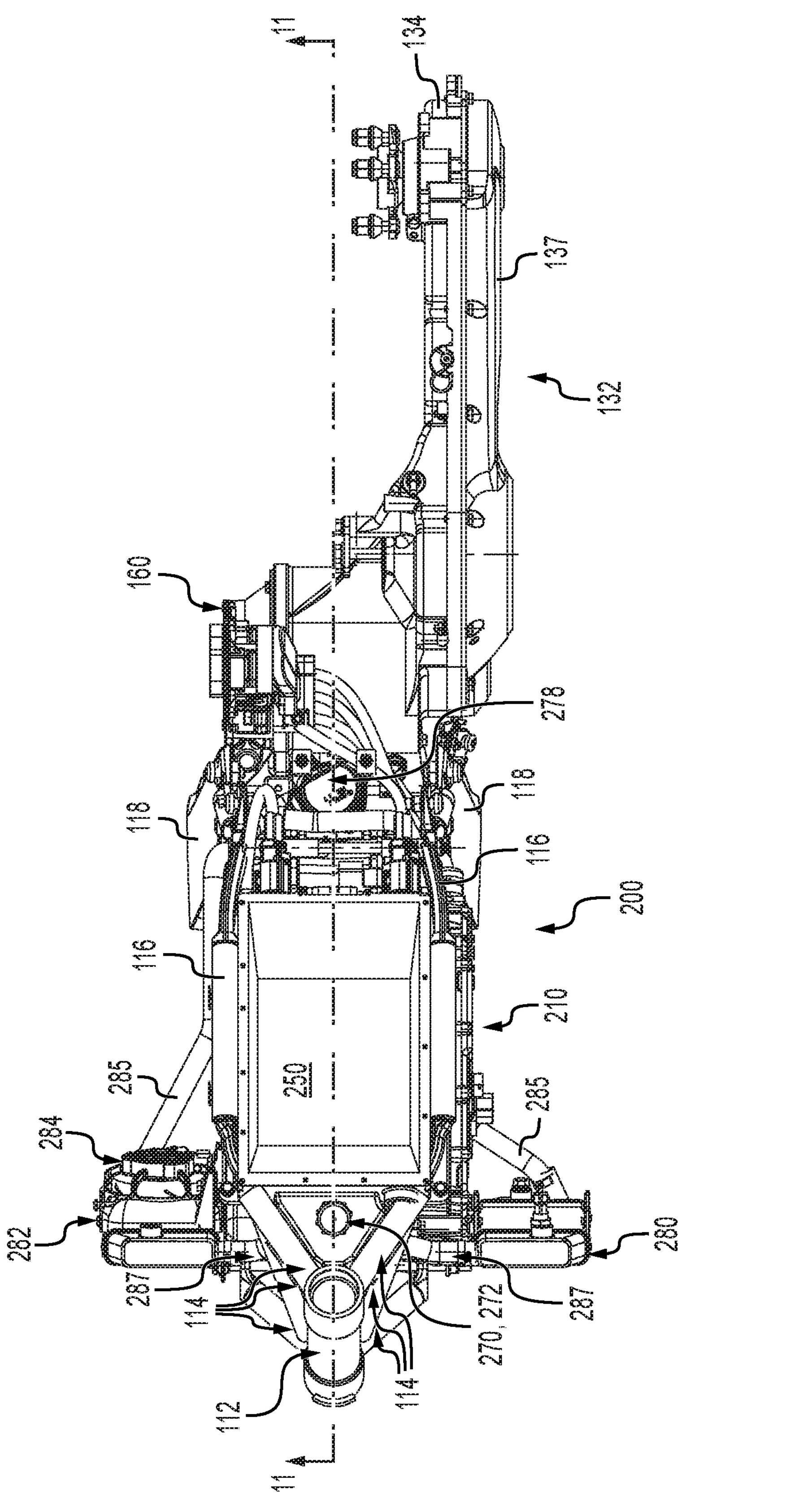
FIG. 8 is a top plan view of the components of FIG. 6 with the housing cover of the swing arm.

The vehicle 100 has a frame 110, shown in additional detail in FIGS. 6 to 8. The frame 110 includes a front suspension receiving portion 112, specifically a tube 112, sometimes referred to as a "head tube", for receiving therethrough a front fork assembly 124 (described in more detail below). Extending rearward from the tube 112, the frame 110 includes forward frame members 114. In the illustrated embodiment, there are six forward frame members 114 (three on each side of the centerplane 103) but it is contemplated that the specific number and arrangement of forward frame members 114 could vary.

The frame 110 also includes two upper intermediate frame members 116 extending rearward from the forward members 114. The frame members 116 are generally hockey-stick shaped, with rear portions of the members 116 curving rearward and downward from generally horizontal forward portions of the members 116. In different embodiments, the frame members 116 could be differently shaped.

The frame 110 further includes two lower intermediate frame members 118 connected to rear ends of the frame members 116. The frame members 118 extend generally vertically along left and right sides of the vehicle 100. The frame members 118 are generally in the shape of flattened boomerangs, but the particular shape could vary.

The frame 110 further includes a rear frame structure 120 (FIGS. 4 and 5) connected to and extending rearward and slightly upward from the upper intermediate frame members 116 and the lower intermediate frame members 118 (omitted from FIGS. 6 and 7). The rear frame structure 120 is also referred to as a seat support structure 120. It is contemplated that the frame 110 could include additional frame members, including but not limited to additional intermediate frame members and additional rear frame members.

The vehicle 100 is a two-wheeled vehicle 100 including a front wheel 121 and a rear wheel 127. The front wheel 121 and the rear wheel 127 each have a tire secured thereto. The front wheel 121 and the rear wheel 127 are centered with respect to the longitudinal centerplane 103.

The front wheel 121 is connected to the frame 110 by a front suspension assembly 123. The front suspension assembly 123 includes a front fork assembly 124 for supporting the front end 102 of the vehicle 100. The front fork assembly 124 includes a triple clamp assembly 125 connected to the tube 112 of the frame 110. The front fork assembly 124 includes a pair of front shocks 122 connected to the triple clamp assembly 125. The front wheel 121 of the front fork assembly 124 is connected to a bottom portion of the pair of front shocks 122.

The rear wheel 127 mounted to the frame 110 by a rear suspension assembly 130. The rear suspension assembly 130 includes a swing arm 132 and a shock absorber 136. The swing arm 132 is pivotally mounted at a front thereof to the frame 110, specifically to lower portions of the lower intermediate frame portions 118. As best seen in FIG. 6, the swing arm 132 includes a swing arm housing 134, in which is disposed an electric motor 160 and a drivetrain 170. The swing arm 132 includes a housing cover 137 selectively removable from the housing 134. The swing arm housing 132 and the housing cover 137 enclose the drivetrain 170. When the housing cover 137 is in place, the drivetrain 170 is bathed in lubricant within the swing arm 132.

The rear wheel 127 is rotatably mounted to the rear end of the swing arm 132 which extends on a left side of the rear wheel 127. The shock absorber 136 is connected between the swing arm 132 and the frame 110, specifically to the intermediate frame members 116. It is contemplated that the relative arrangement of the shock absorber 136 and the frame 110 could vary in different embodiments. The electric motor 160 and the drivetrain 170 will be described in more detail below.

The vehicle 100 has a straddle seat 140 mounted to the frame 110, specifically to the rear frame structure 120, and disposed along the longitudinal centerplane 103. In the illustrated implementation, the straddle seat 140 is intended to accommodate a single adult-sized rider, i.e. the driver. It is however contemplated that the seat 140 could be longer or that a passenger seat portion could be connected to the rear frame structure 120 in order to accommodate a passenger behind the driver. Depending on the particular implementation, it is also contemplated that the seat 140 could be supported by an assembly of frame members or tubes, a molded portion integrally connected to the seat 140, or body panels of the motorcycle 100.

Figure 2:
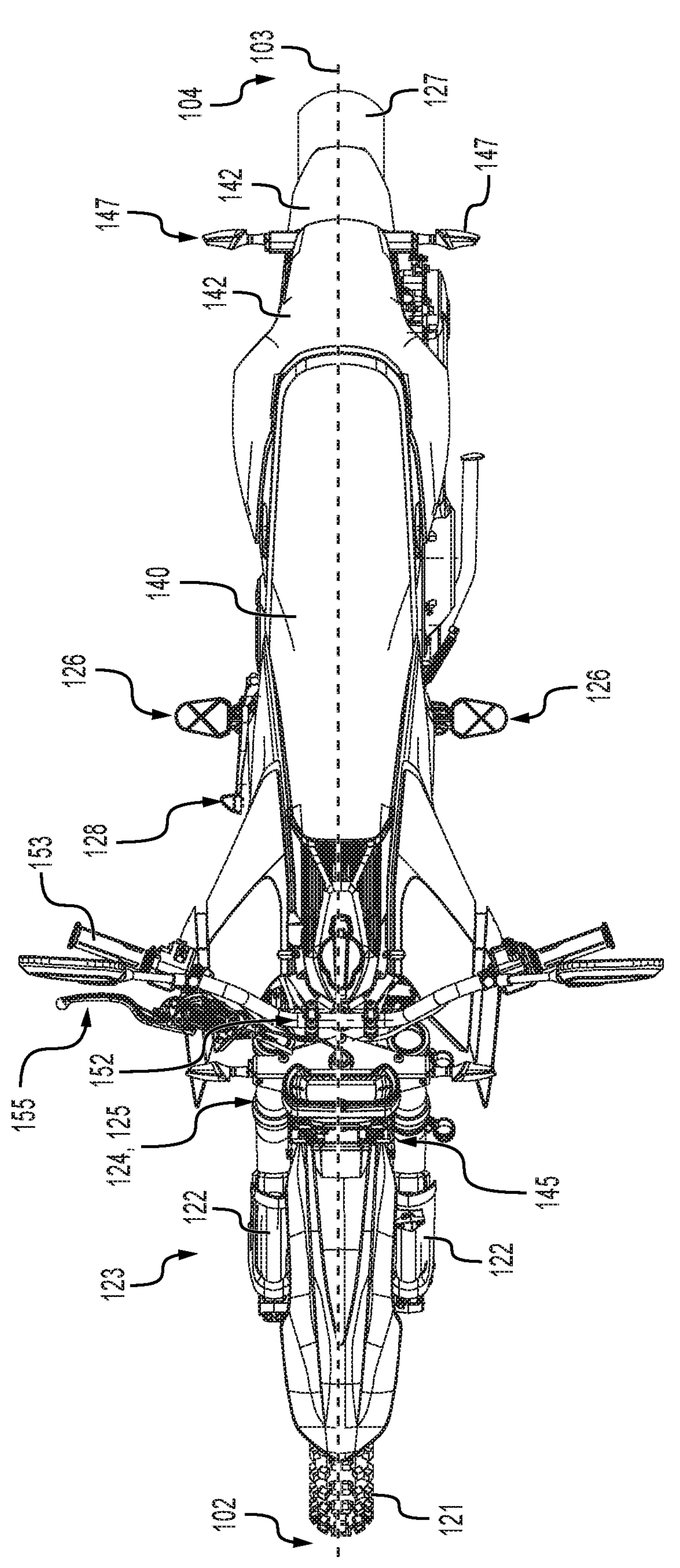
FIG. 2 is a top plan view of the vehicle of FIG. 1.
Figure 3:
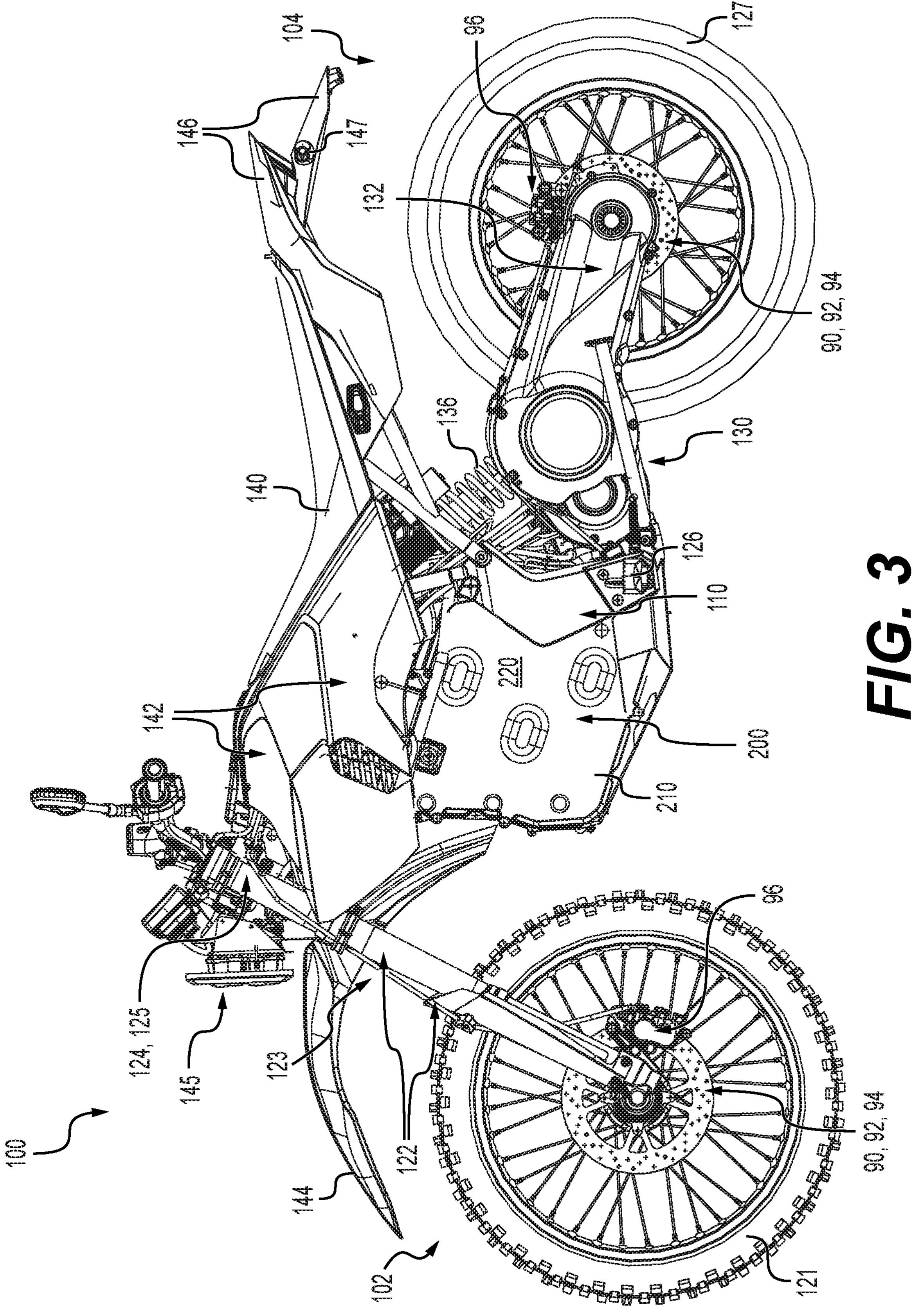
FIG. 3 is left side elevation view of the vehicle of FIG. 1.

The vehicle 100 further includes a plurality of body panels 142 for forming the body of the vehicle 100, illustrated in FIGS. 1 to 3. The body panels 142 are connected to and supported by the frame members 114, 116. The body panels 142 enclose and protect some internal components of the vehicle 100 such as a powerpack 200 (described further below). The vehicle 100 also includes a front fender 144 disposed at the front of the vehicle 100 and extending partially over the front wheel 121. Rearward of the seat 140, the vehicle 100 also has rear fender panels 146 extending at least partially over rear wheel 127. The vehicle 100 includes front headlights 145 attached to the front fork assembly 124 and electrically connected to a battery pack 210 (described further below). The vehicle 100 also has rear braking and indicator lights 147 supported by the rear panels 146 and electrically connected to the battery pack 210.

Depending on the particular embodiment, especially between different motorcycle types (trail-style motorcycle or cruiser-style motorcycle for example), the body panels 142 and the fenders 144, 146 could be different in shape and number. For example, some embodiments of the vehicle 100 could include a mud flab connected to a rear edge of one of the body panels 142. It is further contemplated that one or both of the fenders 144 and rear panels 146 could be omitted in some cases.

A driver footrest 126 is disposed on either side of the vehicle 100 and vertically lower than the straddle seat 140 to support the driver's feet. The driver footrests 126 are connected to the frame members 118. It is contemplated that the footrests 126 could be implemented in various forms other than those illustrated, including but not limited to pegs and footboards. It is contemplated that the vehicle 100 could also be provided with one or more passenger footrests disposed rearward of the driver footrest 126 on each side of the vehicle 100, for supporting a passenger's feet when a passenger seat portion for accommodating a passenger is connected to the vehicle 100. A brake pedal 128 is connected to the right driver footrest 126 for braking the vehicle 100. The brake pedal 128 extends upwardly and forwardly from the right driver footrest 126 such that the driver can actuate the brake pedal 128 with a front portion of the right foot while a rear portion of the right foot remains on the right driver footrest 126.

Figure 4:
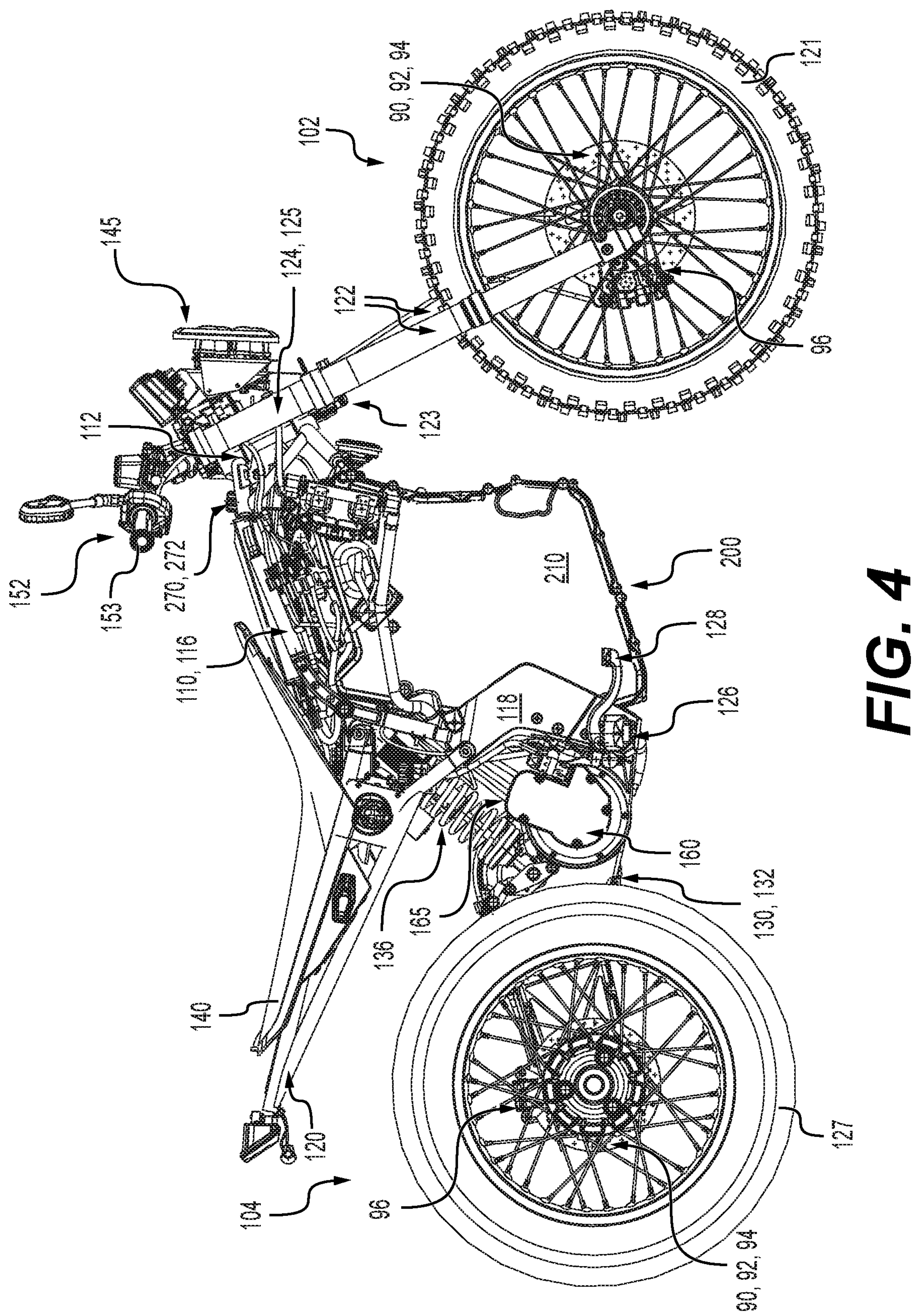
FIG. 4 is a right side elevation view of the vehicle of FIG. 1, with body panels having been removed.
Figure 5:
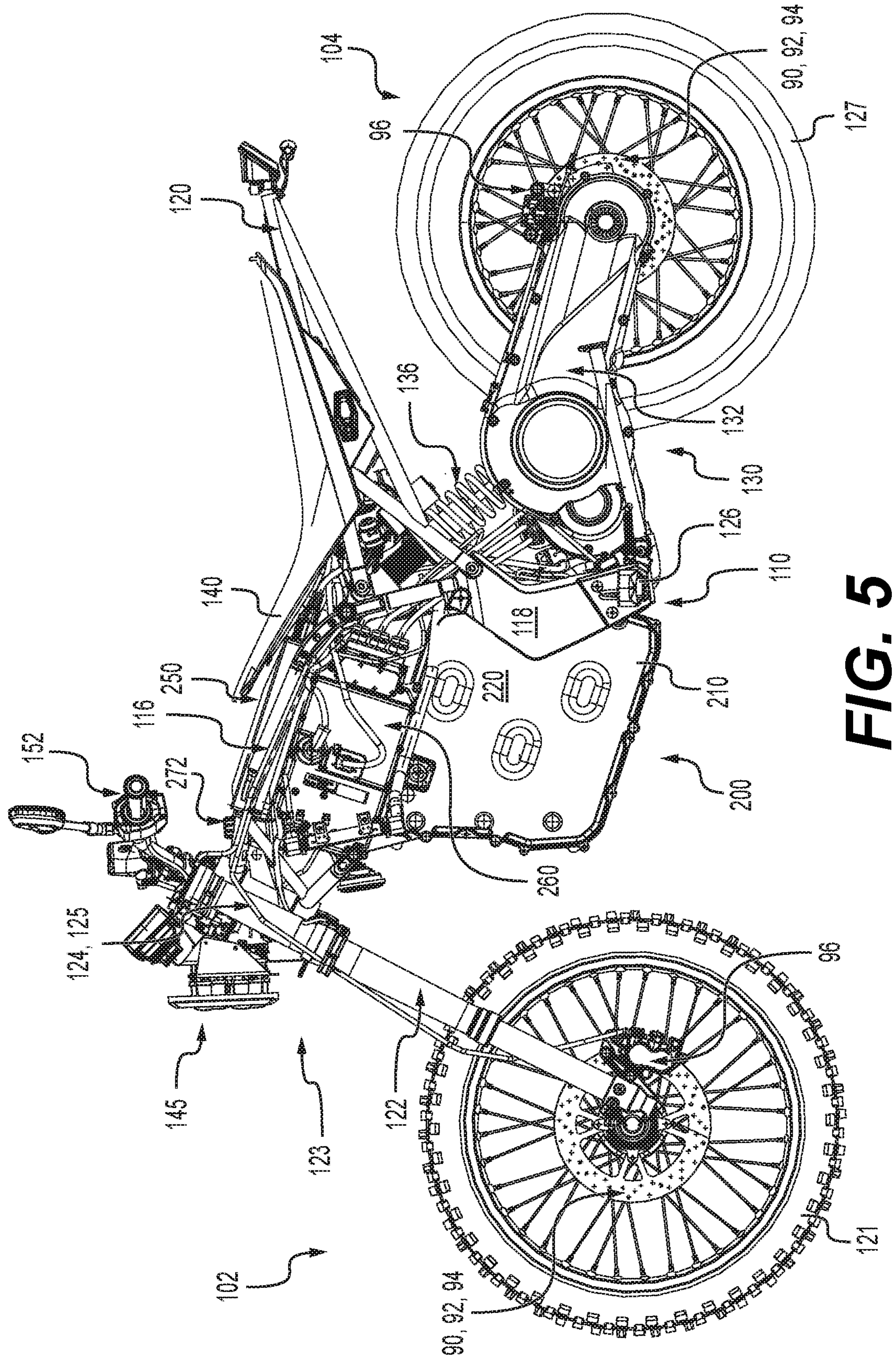
FIG. 5 is a left side elevation view of the vehicle of FIG. 1, with body panels having been removed.

With reference to FIGS. 3 to 5, each of the front wheel 121 and the rear wheel 127 is provided with a brake assembly 90. The brake assemblies 90 of the wheels 121, 127, along with the brake pedal 128, form a brake system 92. Each brake assembly 90 is a disc-type brake mounted onto the spindle of the respective wheel 121 or 127. Other types of brakes are contemplated. Each brake assembly 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 94. The brake pedal 128, as well as a hand brake 155 described below, are operatively connected to the brake assemblies 90 provided on each of the front wheel 121 and the rear wheel 127. The brake system 92 further includes a regenerative braking system (not shown) that uses the electric motor 160 as a generator to charge battery cells of the battery pack 210 while slowing the vehicle 100.

Returning to FIGS. 1 to 5, the vehicle 100 includes a handlebar assembly 152 operatively connected to the front fork assembly 124 and disposed in front of the seat 140. The handlebar assembly 152 is used by the rider to turn the front wheel 121, via the front fork assembly 124, to steer the vehicle 100. Specifically, the handlebar assembly 152 is connected to a top end of the triple clamp assembly 125. The handlebar assembly 152 and the triple clamp assembly 125 define a steering axis about which the front wheel 121 turns to steer the vehicle 100. A twist-grip throttle 153 is operatively connected on the right side of the handlebar assembly 152 for controlling vehicle speed. It is contemplated that the twist-grip throttle 153 could be replaced by a throttle lever or some other type of throttle input device. The twist-grip throttle 153 could be disposed on the left side of the handlebar assembly 152 in some embodiments. The handlebar assembly 152 also includes a hand brake 155 on a right side for activating the brake assemblies 90.

It is contemplated that the vehicle 100 could include a variety of different features excluded from discussion here, including but not limited to: a windscreen, radio and/or navigational systems, and luggage rack systems.

The vehicle 100 further includes an electronic powerpack 200, an electric motor 160, and a drivetrain 170 for driving the vehicle 100, specifically the rear wheel 127. With additional reference to FIGS. 6 to 8, the electric motor 160 is disposed in the swing arm 132. As the swing arm 132 pivots relative to the frame 110, the motor 160 moves with the swing arm 132. In the present embodiment, the motor 160 is a three-phase electric motor 160. It is contemplated that different types of motors could be used in some embodiments.

The motor 160 is operatively connected to the drivetrain 170 disposed in the swing arm 132, as is illustrated in FIG. 6, in which the housing cover 137 has been removed to show the drivetrain 170. An output shaft 161 of the motor 160 has a gear 171 disposed thereon for engaging the drivetrain 170. The drivetrain 170 includes a gear wheel 172, a front sprocket 174 connected to the gear wheel 172 and a rear sprocket 176. The sprocket 174 engages a belt 178 which in turn engages the sprocket 176. A belt tensioner 177 presses against the lower part of the belt 178 between the sprockets 174, 176.

Power is provided to the motor 160 by the electronic powerpack 200. Illustrated in additional detail in FIGS. 6 to 8, the powerpack 200 is supported by the frame 110. In the present embodiment, the powerpack 200 is connected to the frame members 118 but different embodiments could have different structural arrangements for connecting the powerpack 200 to the frame 110.

With additional reference to FIGS. 9 to 13, the powerpack 200 includes a battery pack 210. The battery pack 210 includes a battery housing 220. The battery housing 220 is fastened to the frame members 118 to support the powerpack 200 in the illustrated embodiment. The battery pack 210 includes a plurality of battery cells 230 housed in the battery housing 220. The battery pack 210 is described in more detail below.

The powerpack 200 includes a charger 250 connected to the battery pack 210. The charger 250 includes a charger housing 252 surrounding internal electronic components (not shown) of the charger 250. The charger 250 is mounted to the battery housing 220. Specifically, the charger housing 252 is fastened to the battery housing 220 and is disposed on a top side of the battery housing 220. It is contemplated that the location of the charger 250 relative to the battery pack 210 could vary.

The charger 250 is electrically connected to the battery cells 230 for supplying charge to the battery cells 230; the connection arrangement is described in more detail below. The vehicle 100 includes a socket 258 electrically connected to the charger 250 for electrically connecting to an external power source for providing electricity to the charger 250 for charging the battery cells 230. The socket 258 is disposed generally rearward of the charger 250 and extends at least partially through one of the body panels 142, but the specific location could vary.

The powerpack 200 also includes an inverter 260 disposed on a left side of the battery pack 210. The inverter 260 includes an inverter housing 262 which is fastened to the battery housing 220, specifically along a left side of the battery housing 220. As such, the inverter 260 is mounted to the battery housing 220. In some embodiments, it is contemplated that the inverter 260 could be disposed on a different side of the battery pack 210.

Figure 10:
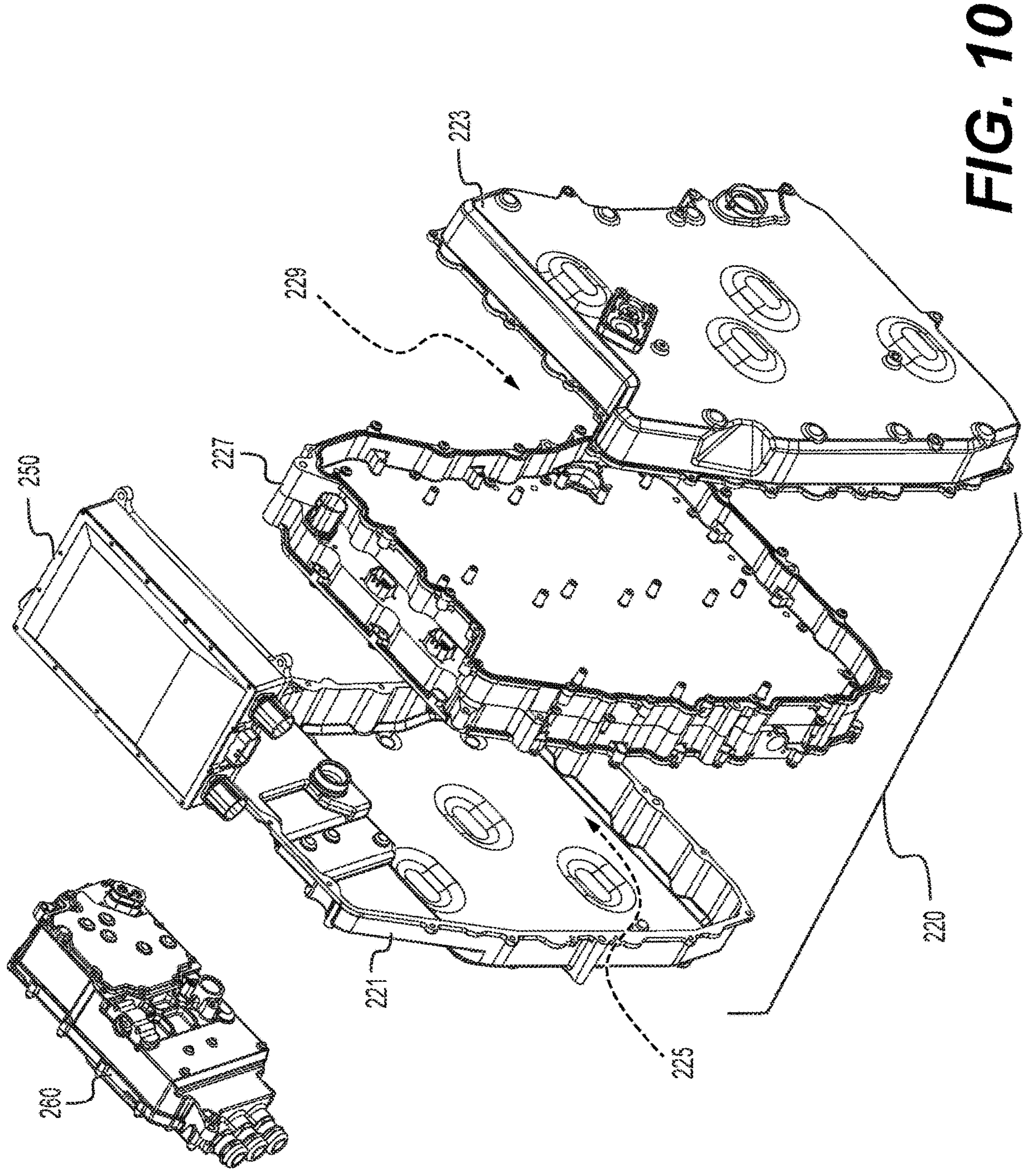
FIG. 10 is a perspective, exploded view of portions of the powerpack of FIG. 6, with battery cells having been removed.

In order to electrically connect to the battery cells 230 in the battery pack 210, the inverter 260 includes an electric connector 261 disposed on an exterior of the invertor housing 262 (see FIG. 10). The battery pack 210 includes an electric connector 215 electrically connected to the battery cells 230 and disposed on an exterior of the battery housing 220, specifically on a left side of the housing 220 (see FIG. 17). When the vehicle 100 is in operation, the inverter 260 receives electric power from the battery cells 230 via the electric connector 215 and the electric connector 261.

The connector 215 is arranged to receive the connector 261 of the inverter 260, such that the electric connector 215 and the electric connector 261 are selectively connected together for managing electricity flow from the battery pack 210 to other electronic components of the vehicle 100. As can be seen in at least FIG. 6, the inverter 260 is electrically connected to the three-phase motor 160 via three power cords 165 connected to three outlets 269 of the inverter 260. The number of cords or type of electrical connection between the inverter 260 and the motor 160 could vary in different embodiments. While the inverter 260 connects directly to the battery pack 210 in the present embodiment, it is contemplated that the inverter 260 could be separated and spaced from the battery pack 210 and electrically connected to the battery cells 230 via power cords or the like.

In the illustrated embodiment, the vehicle 100 further includes cooling system including a liquid-based cooling circuit 290 (shown schematically in FIG. 5) for managing the temperature of the powerpack 200 during operation of the vehicle 100. Heat transfer in the cooling circuit 290 is provided by a liquid coolant, generally glycol-water coolant, but it is contemplated that other coolants could be used. It is noted that while liquid coolant is provided, some gases may also be present in the cooling circuit 290, due to phase transitions or air infiltrations. In the present embodiment, the cooling circuit 290 cools the powerpack 200 and the motor 160, but the cooling circuit 290 could be limited to the powerpack 200 in some embodiments. It is also contemplated that some components of the powerpack 200 could be omitted from the cooling circuit 290 and cooling could be provided by other means. For example, some components of the vehicle 100 could be cooled through air cooling.

Figure 14:
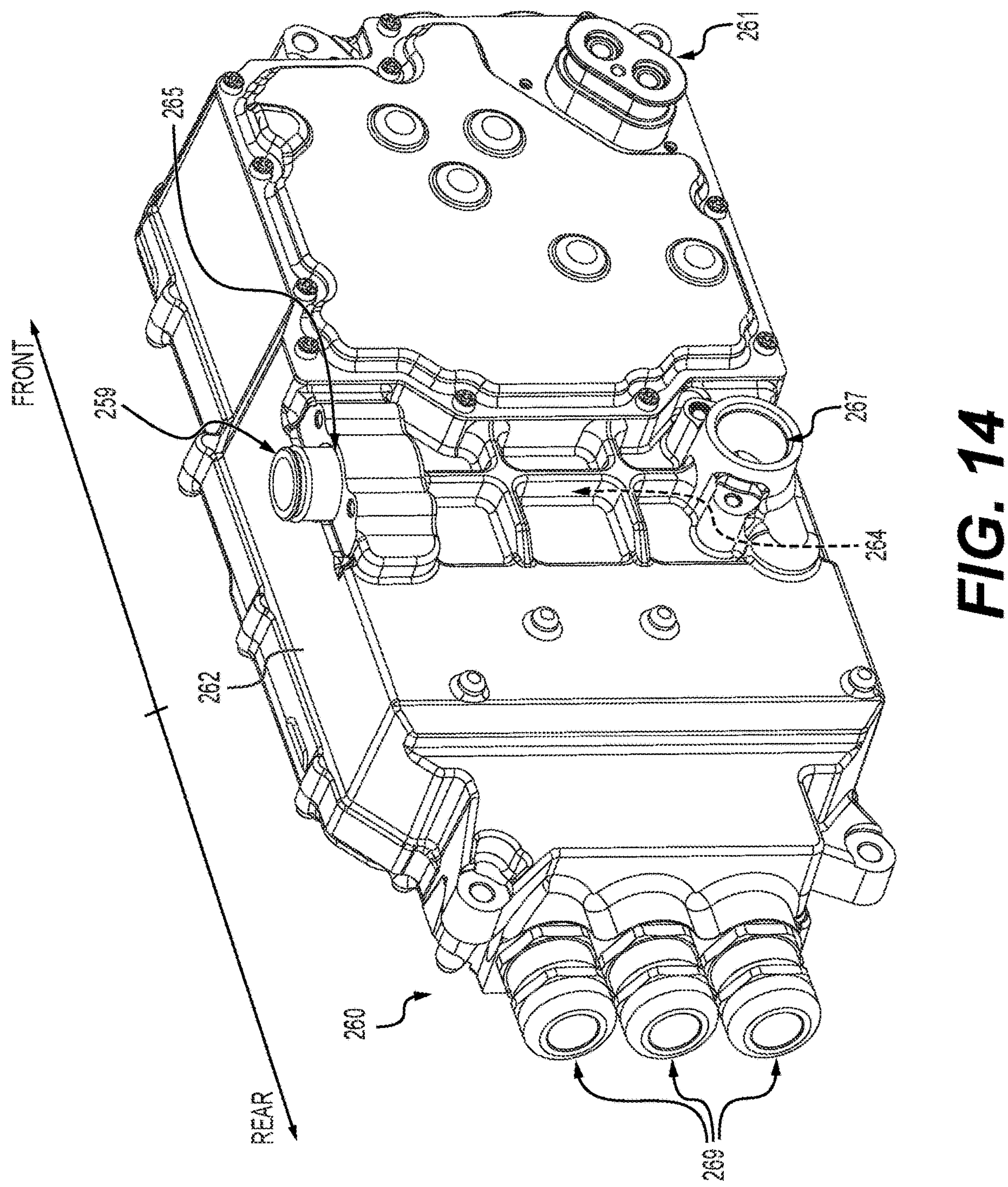
FIG. 14 is a top, rear, right side perspective view of an inverter and a rigid connector of the powerpack of FIG. 6.

The cooling circuit 290 is formed, in part, by a charger cooling channel 254 defined the charger housing 252 (see FIG. 11) and an inverter cooling channel 264 formed by the inverter housing 262 (see FIG. 14).

Figure 9:
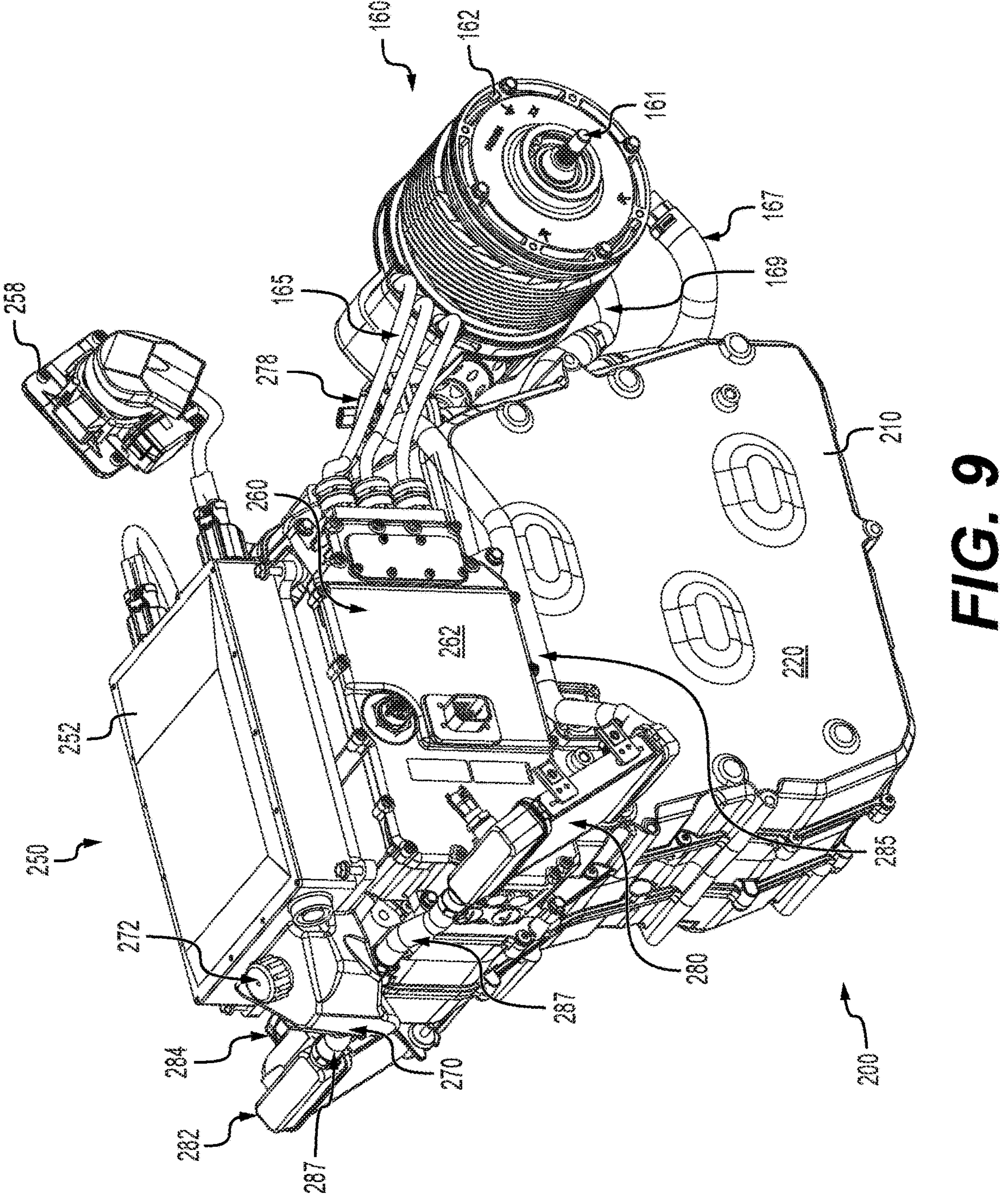
FIG. 9 is a top, front, left side perspective view of the powerpack, the motor, and the cooling circuit components of the vehicle of FIG. 1.

With reference to FIGS. 7 to 9, the cooling system of the vehicle 100 also includes a coolant pump 278 for circulating cooling through and forming a portion of the coolant circuit 290. In the illustrated embodiment, the coolant pump 278 is electrically connected to the battery pack 210 for powering the pump 278 (described further below). The pump 278 is disposed partially rearward of the powerpack 200 in the present embodiment, although it is contemplated that placement of the pump 278 could vary.

The vehicle 100 further includes two radiators 280, 282 for cooling the coolant fluid. In the illustrated embodiment, the radiators 280, 282 are disposed partially forward of the powerpack 200, although exact placement could vary in different embodiments. The vehicle 100 includes two flexible tubes 285, with each tube 285 being connected between a corresponding one of the radiators 280, 282 and the pump 278, forming a portion of the cooling circuit 290. In the illustrated embodiment, the right radiator 282 includes a fan 284 connected to the housing of the radiator 282 to aid in increasing the cooling efficiency of the radiator 282. Depending on the embodiment, it is contemplated that the left radiator 280 could additionally or alternatively include a fan connected thereto. It is also contemplated that the fan 284 could be omitted in some cases.

The cooling system also includes a coolant reservoir 270 connected to the powerpack 200 and fluidly connected to the cooing circuit 290. The reservoir 270 receives liquid coolant therein and supplies coolant to the cooling circuit 290. The reservoir 270 includes a reservoir cap 272 selectively connected thereto. The reservoir 270 provides for coolant to be refilled or supplemented if necessary. When the cap 272 is removed, additional coolant fluid can be added to the reservoir 270 to supplement the fluid level of coolant in the cooling circuit 290. It is contemplated that the reservoir 270 could be omitted in some embodiments. The reservoir 270 is disposed partially forward of the powerpack 200, but it is contemplated that the exact positioning of the reservoir 270 could vary in different embodiments. The radiators 280, 282 are connected to the coolant reservoir 270 via two flexible hoses 287.

Figure 13:
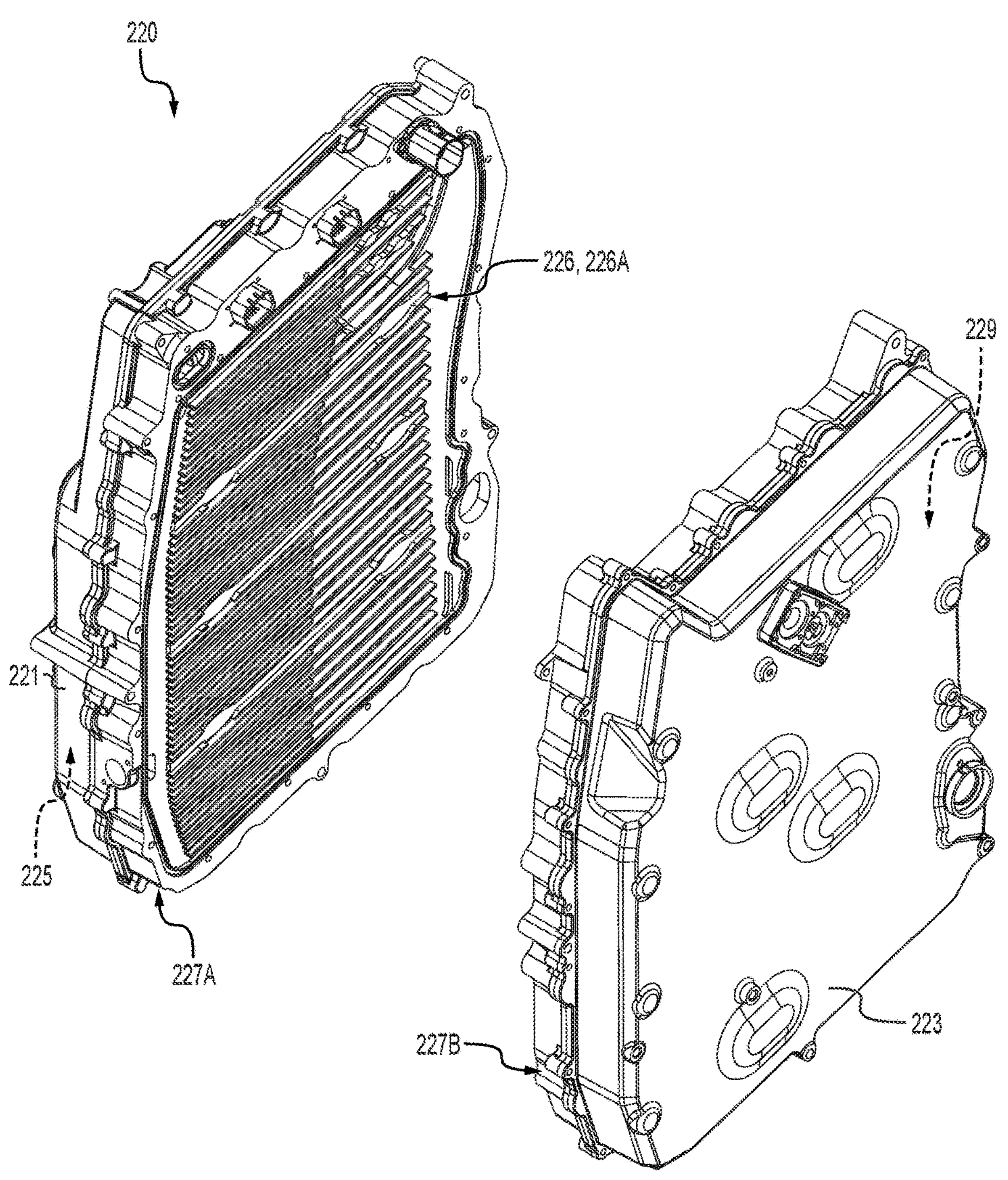
FIG. 13 is a top, rear, right perspective, partially-exploded view of the battery pack of FIG. 12.

Returning to the battery pack 210 and with additional reference to FIGS. 10 to 13, the battery housing 220 includes a housing body 227, forming a center portion of the housing 220. As is illustrated in FIG. 13, the housing body 227 includes a left lateral portion 227A and a right lateral portion 227B connected together to form the body 227. In the illustrated embodiment the left and right lateral portions 227A, 227B are selectively connected together via threaded fasteners (not shown). It is contemplated that the left and right lateral portions 227A, 227B could be otherwise connected together in different manners. In the present embodiment, the housing body 227 is formed from aluminum, but could be formed from different materials, including but not limited to plastic or other metals.

Figure 11:
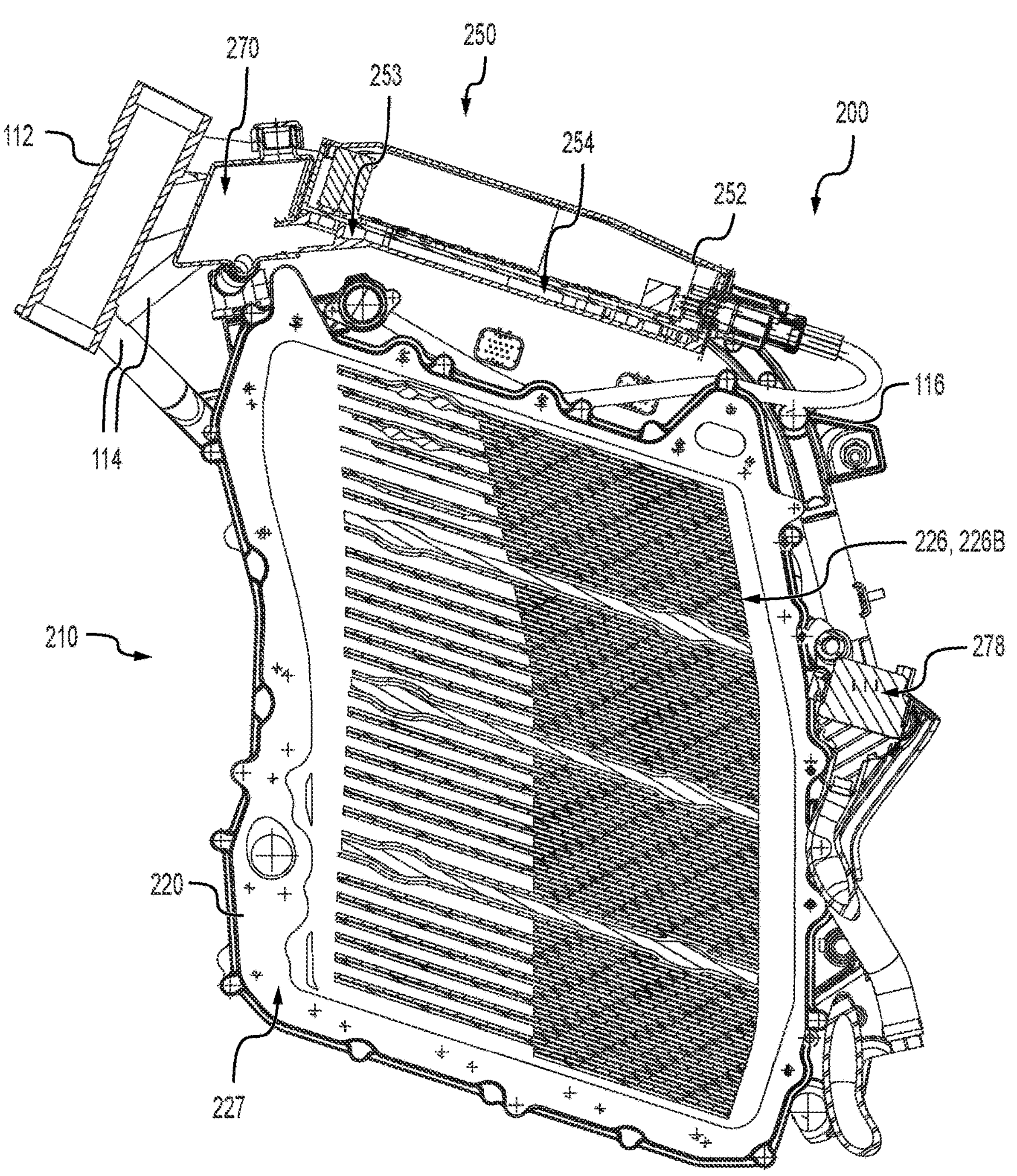
FIG. 11 is a cross-sectional view of portions of the powerpack of FIG. 6, taken along line 11-11 of FIG. 8.
Figure 12:
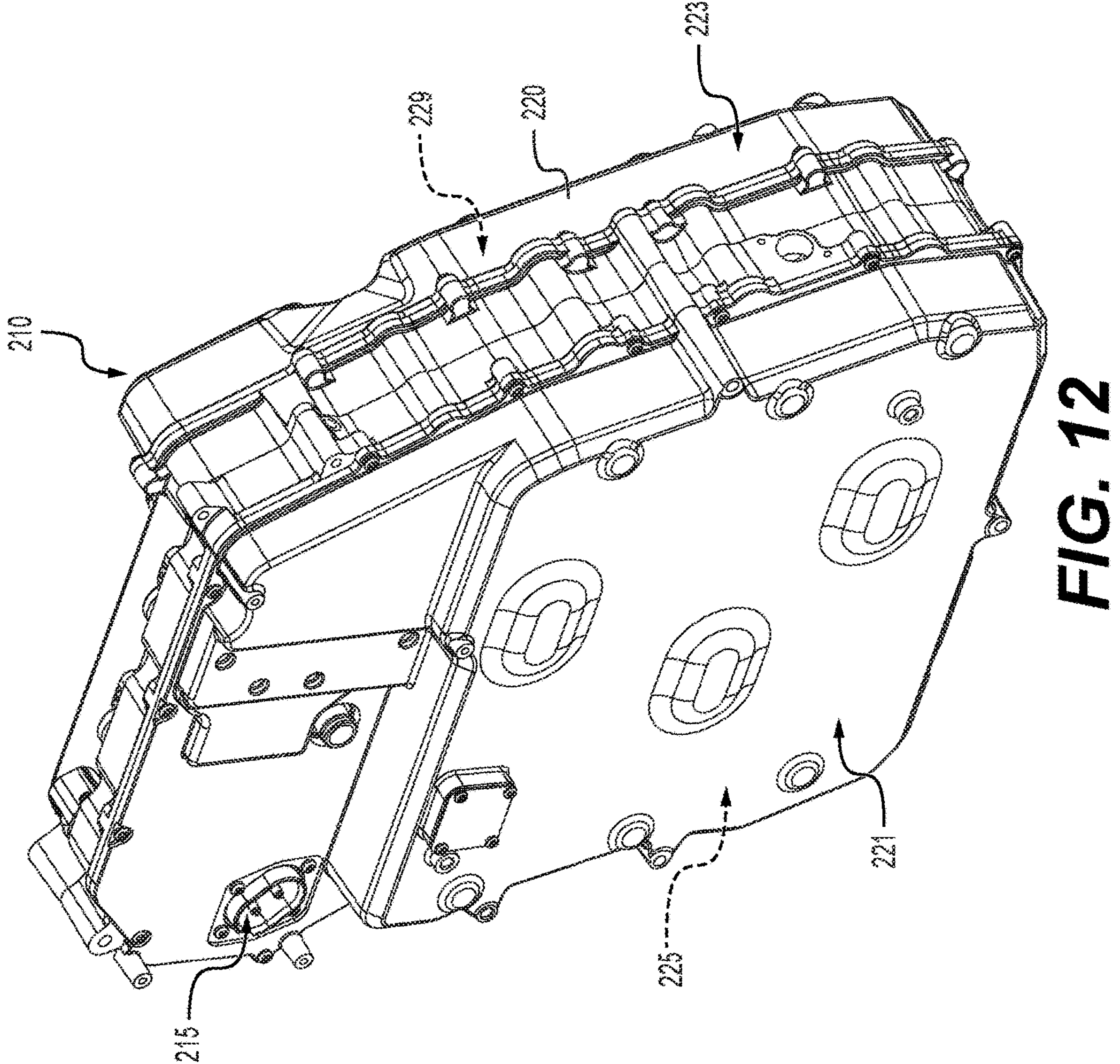
FIG. 12 is a rear, left side perspective view of a battery pack of the powerpack of FIG. 6.
Figure 15:
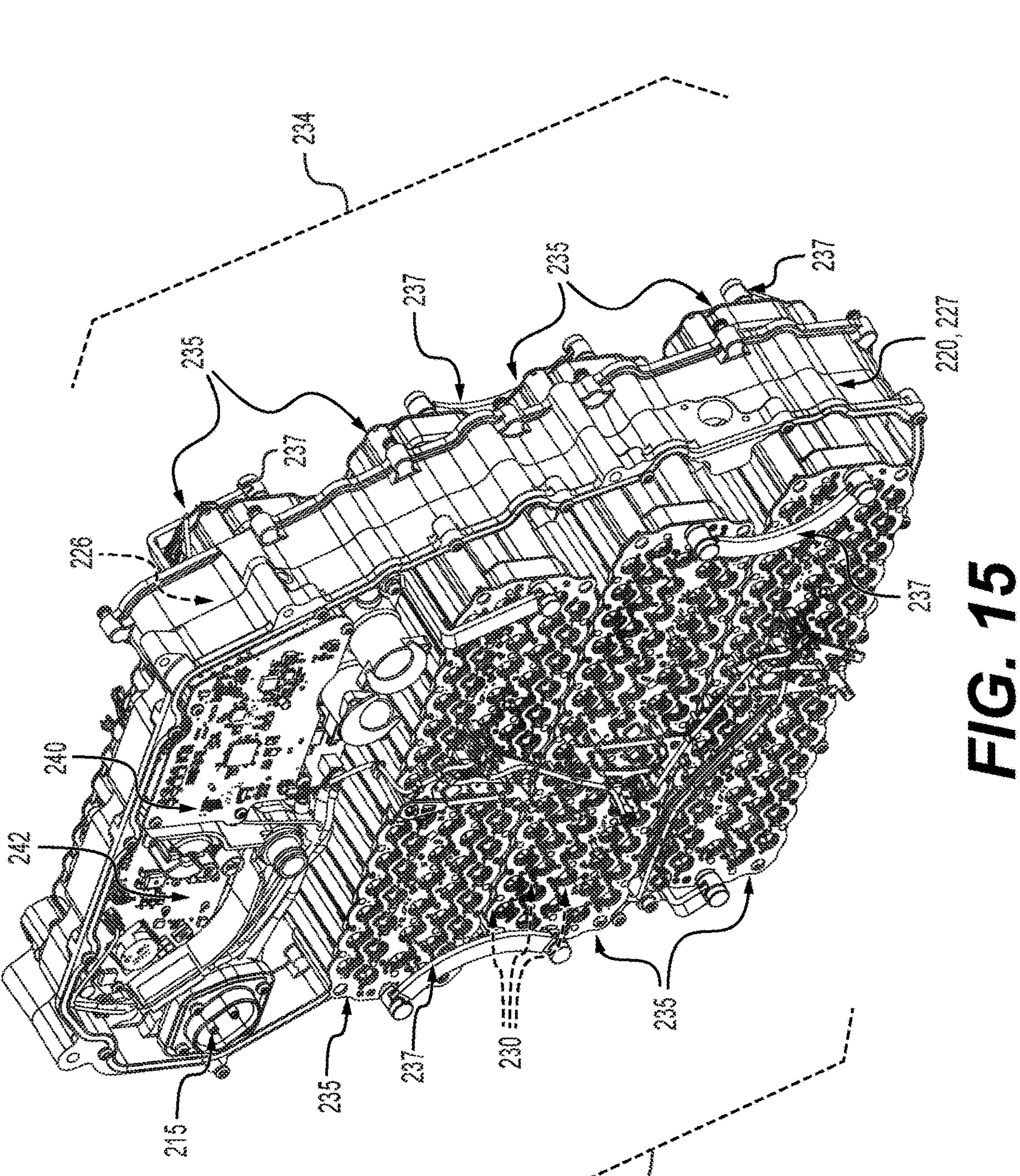
FIG. 15 is a top, rear, left side perspective view of the battery pack of FIG. 12, with a battery pack housing having been removed.

The battery housing 220 defines a battery cooling channel 226 therein, specifically through a center portion of the housing body 227. As can be seen in FIGS. 11 and 13, the battery cooling channel 226 includes a plurality of fins extending inward from the housing 220 and coolant fluid flows along a longitudinal direction through a center portion 227 of the housing 220, along the direction of the centerplane 103, as well as along a vertical/lateral plane of the vehicle 100 (orthogonal to the centerplane 103), descending toward a battery cooling channel outlet 217 (FIG. 15). An inner face of the left lateral portion 227A includes a first channel form 226A (FIG. 13) formed thereon and an inner face of the right lateral portion 227B includes a second channel form 226B (FIG. 11) formed thereon. The cooling channel 226 is defined by the space created between the channel forms 226A, 226B of the inner faces of the left and right lateral portions 227A, 227B. The battery cooling channel 226 is fluidly connected, through the outlet 217 as well as a channel inlet 219 (FIG. 15) to the coolant reservoir 270, the coolant pump 278, the charger cooling channel 254, and the inverter cooling channel 264.

The battery housing 220 also includes a left side cover 221 selectively connected to the housing body 227, specifically selectively connected to the left lateral portion 227A. The housing 220 similarly includes a right side cover 223 selectively connected to the housing body 227, specifically selectively connected to the right lateral portion 227B. Each cover 221, 223 is selectively fastened to the housing body 227 to encase the components therein. It is contemplated that the covers 221, 223 could be selectively connected to the housing body 227 in different manners, including for example by tabs. A left chamber 225 is formed between the center portion of the housing body 227 and the left cover 221. A right chamber 229 is formed between the center portion of the housing body 227 and the right cover 223. The left and right chambers 225, 229 are shown in the exploded view of FIG. 10.

Figure 16:
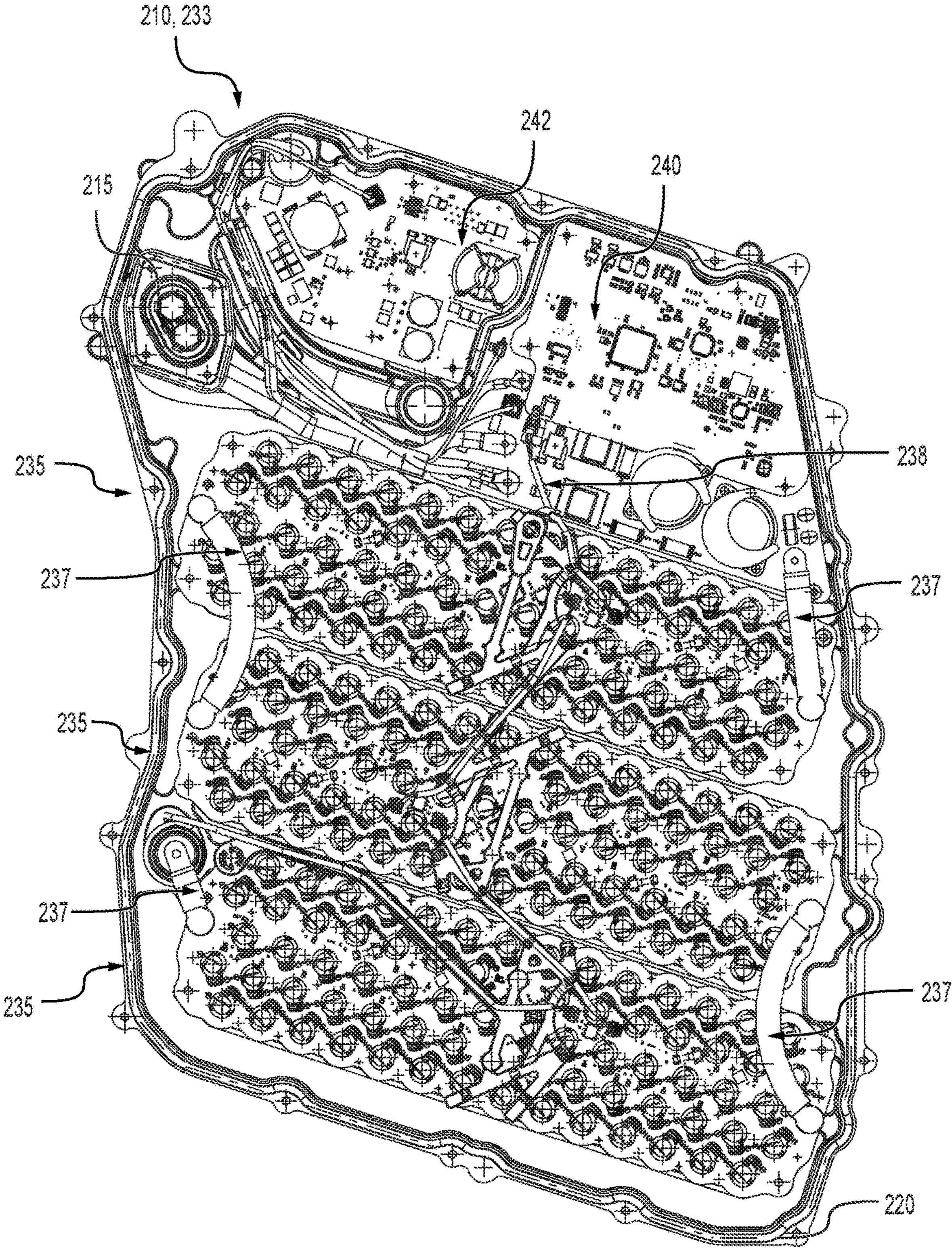
FIG. 16 is a left side elevation view of the housing-removed battery pack of FIG. 15.
Figure 17:
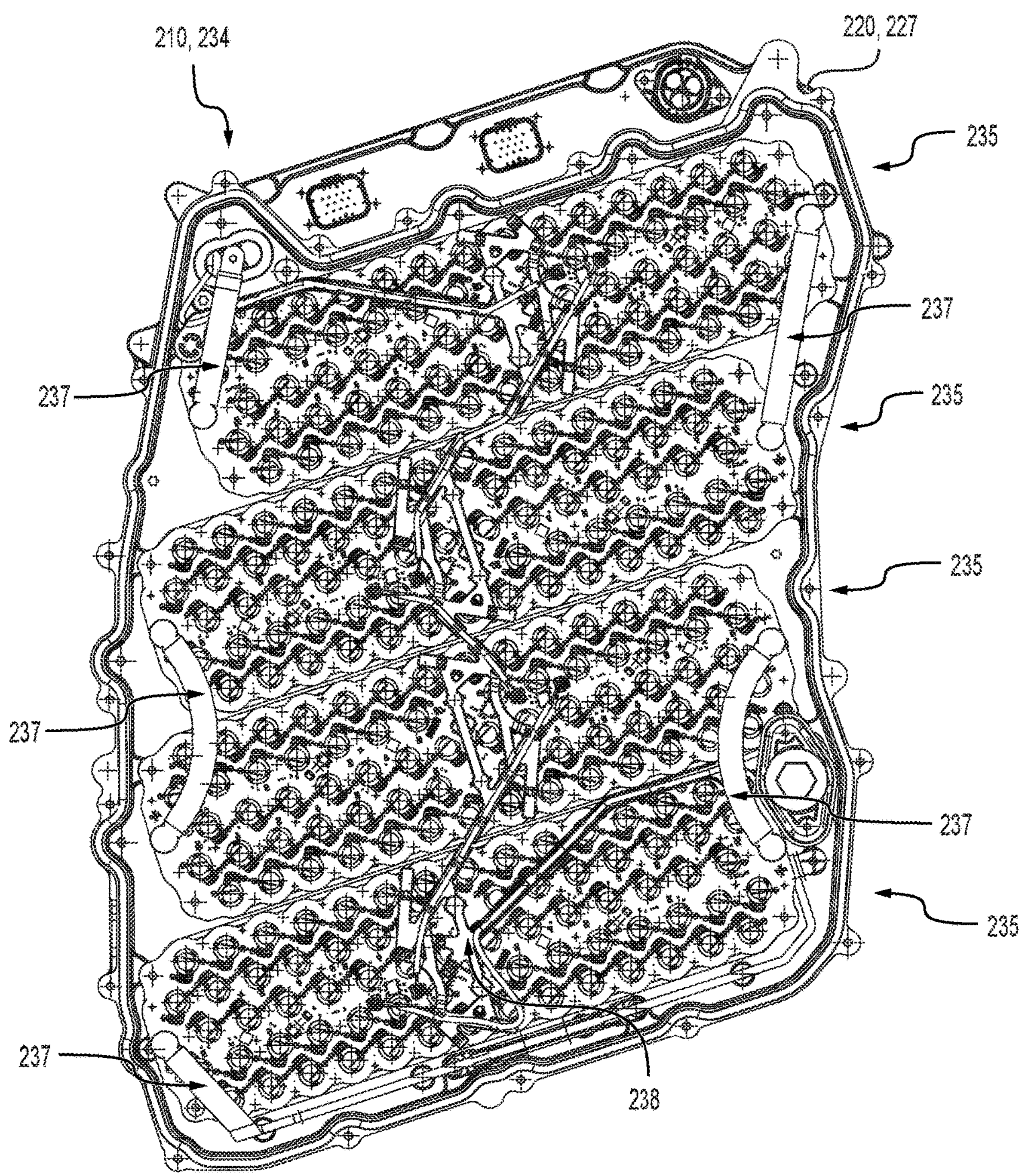
FIG. 17 is a right side elevation view of the housing-removed battery pack of FIG. 15.

The battery pack 210 includes the plurality of battery cells 230, as mentioned above. As can be seen in FIGS. 15 to 17, the battery cells 230 are separated (grouped) into battery modules 235. In the illustrated embodiment, the battery pack 210 includes seven (7) modules 235; the exact number of modules could vary in different embodiments. The arrangement of the battery cells 230 into modules 235 is described further below.

The battery modules 235 are separated into two banks of modules: a left bank 233 having three modules 235 disposed in the left chamber 225, and a right bank 234 having four modules 235 disposed in the right chamber 229. Depending on the embodiment, the left and right banks 233, 234 of modules 235 could include more or fewer modules 235. It is also contemplated that the left and right banks 233, 234 could have equal numbers of modules 235. The left bank 233 has more modules 235 than the right bank 234 in the present embodiment, but it is contemplated that the right bank 234 could have more modules 235 than the left bank 233. Each bank 233, 234 of modules 235 is electrically connected together in series by a plurality of bus bars 237.

Figure 18:
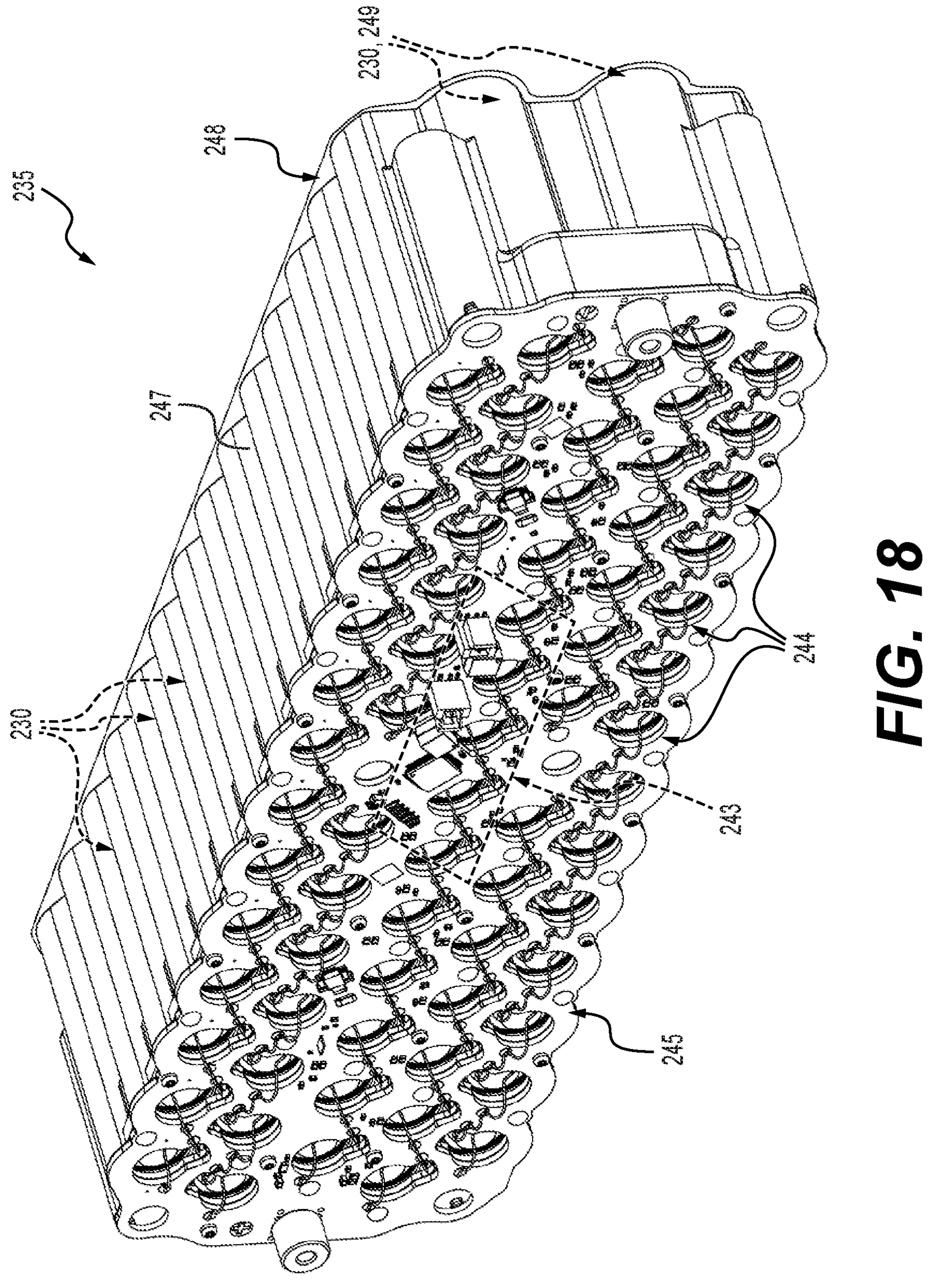
FIG. 18 is a perspective view of a battery module of the battery pack of FIG. 15.
Figure 19:
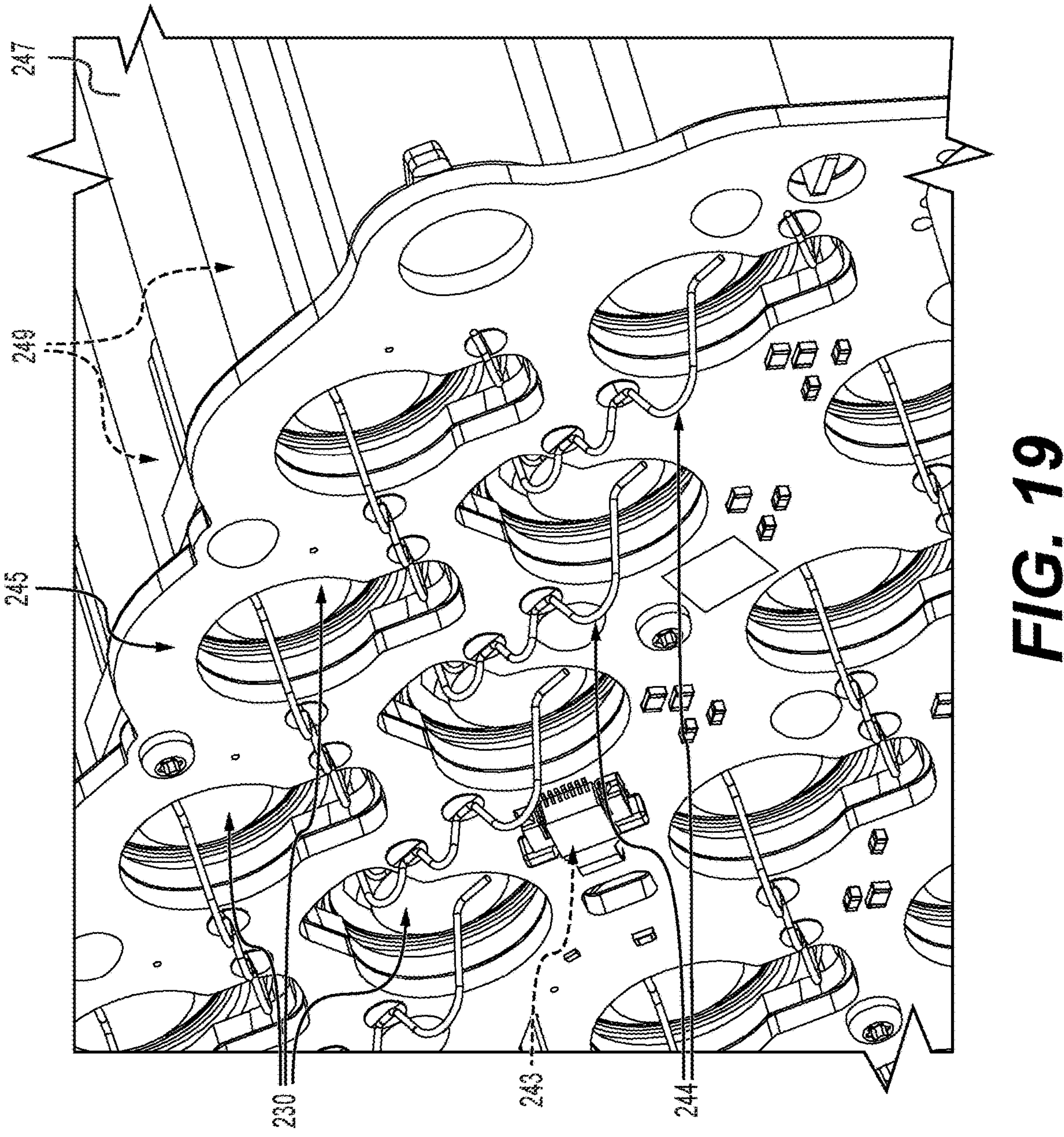
FIG. 19 is a partial, close-up view of the battery module of FIG. 18.

With additional reference to FIGS. 17 to 19, each module 235, also referred to as battery bricks 235, includes a portion of the battery cells 230. The battery cells 230 are cylindrical battery cells 230, specifically 490 (four hundred ninety) total cylindrical battery cells 230. In the present embodiment, the battery cells 230 are 3.5V cylindrical cells, such as LG™ M50L cells, but it is contemplated that different versions of cells could be used in some embodiments. For example, battery cells could vary in nominal energy capacity, usable energy capacity, discharge rate, cell chemistry and cell type.

A long axis of each cylindrical battery cell 230 extends generally laterally in the battery pack 210, generally orthogonal to the cooling channel 226, the centerplane 103, and the lateral outer surfaces of the covers 221, 223. In the illustrated embodiment, each module 235 includes seventy cylindrical battery cells 230 arranged in five parallel rows of fourteen cells 230. It is contemplated that the battery cells 230 could be grouped into larger or smaller modules 235, depending on the embodiment.

Each module 235 includes a support matrix 247 for supporting the battery cells 230. The support matrix 247 is formed from a rigid, electrically isolating material, rigid plastic in the present embodiment. The matrix 247 defines therein seventy generally cylindrical cavities 249 for receiving the battery cells 230 in the support matrix 247. Inner ends of the cells 230 are affixed to and sealed in the support matrix 247 by epoxy 246. Outer ends of the battery cells 230 are restrained by an outer end 247A of the matrix 247, although it is contemplated that other structures could be utilized to maintain the battery cells 230 in the support matrix 247 in different embodiments.

Each module 235 includes a current collector 245 connected to the support matrix 247. Each current collector 245 is arranged to collect current from the battery cells 230 of each module 235 when the battery pack 210 is in powering mode and inversely for distributing charge to each battery cell 230 in a given module 235 when the battery pack 210 is in charging mode. In the current embodiment, the current collector 245 of each module is a printed circuit board (PCB) 245 sized and arranged to cover an external side of the corresponding module 235. In some embodiments, it is contemplated that one current collector electrically connected to multiple modules 235 could be used. In embodiments having a single block of battery cells 230 in each bank 233, 234, for instance, only one current collector/PCB 245 could be used.

As is mentioned above, the modules 235 are electrically connected together in series. Specifically, the three PCBs 245 of the left bank 233 are electrically connected to one another in series via the bus bars 237 and the four PCBs 245 of the right bank 234 are electrically connected to one another in series via the bus bars 237.

In order to impede electric discharge from the battery modules 235 onto the battery housing 220, the left and right covers 221, 223 enclosing the PCBs 245 and outer ends of the battery cells 230 are electrically insulated from the PCBs 245. In the present embodiment, the left and right covers 221, 223 are spaced from the PCBs 245. In different embodiments, it is contemplated that additional materials or components could be implemented to electrically insulate the left and right covers 221, 223 from the battery modules 235.

In the illustrated embodiment of the PCBs 245, each PCB 245 defines a plurality of apertures therein to allow connection to the battery cells 230 to the PCB 245. Each PCB 245 includes a plurality of wire bonds 244 for connecting the battery cells 230 to the PCB 245, and in turn connecting the battery cells 230 together in series. Each wire bond 244 connects an outer perimeter of one battery cell 230 (the negative terminal) to an inner portion of a neighboring battery cells 230 (the positive terminal). The apertures in the PCB 245 are shaped to allow connection to the negative terminal of each battery cell 230 at a specific location, and otherwise covers remaining portions of the negative terminal. The apertures in the PCB 245 generally leave the positive terminals of each battery cell 230 exposed, but it is contemplated that portions of the positive terminal could be covered by the PCB 245 as well.

Each PCB 245 also includes a module battery management system (module BMS) 243 for managing and monitoring operations of the corresponding battery module 235. While each module 235 includes a corresponding module BMS 243 in the present embodiment, it is contemplated that some PCBs 245 could omit the corresponding module BMS 243.

Figure 20:
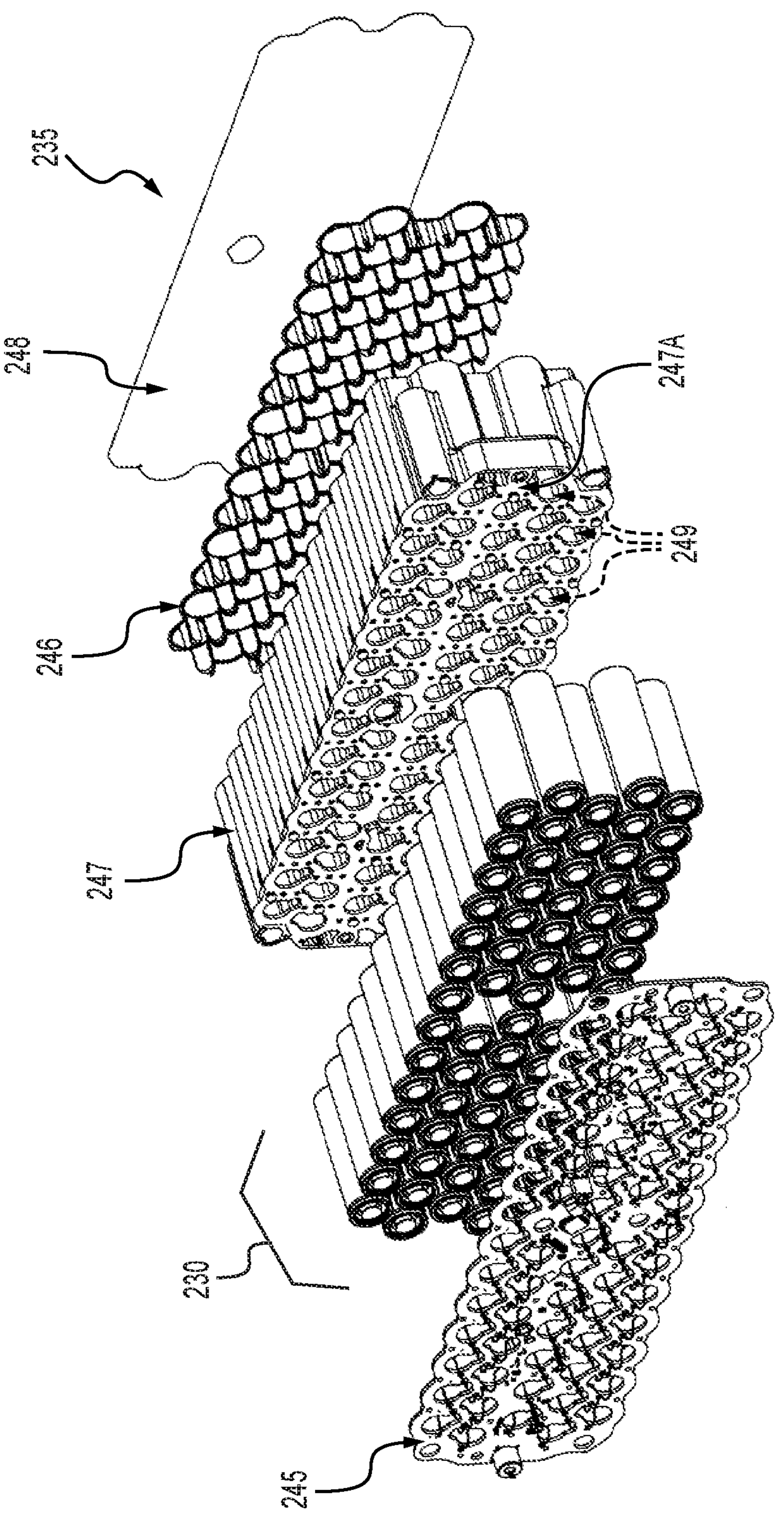
FIG. 20 is a perspective, exploded view of the battery module of FIG. 18.

Each module 235 further includes a dielectric layer 248 disposed inward of the inner ends of the battery cells 230 and bonded to the cells 230 and the matrix 247 by the epoxy layer 246. As can be seen in FIGS. 18 and 20, the dielectric layer 248 forms an inner most surface (as the module 235 is mounted in the battery pack 210) of the module 235. When each module 235 is installed in the battery pack 210, the dielectric layer 248 forms an insulating layer to electrically isolate the battery cells 230 from the housing body 227. In the illustrated embodiment, the dielectric layer 248 is formed by a sheet of electrical insulation paper, although different materials could be used.

It is contemplated that in some embodiments, the battery pack 210 could include one dielectric layer disposed between inner ends of the battery cells 230 of the left bank 233 and the housing body 227 and another dielectric layer disposed between inner ends of the battery cells 230 of the right bank 234 and the housing body 227. In such an embodiment, for instance, the dielectric layers could be applied to a majority or an entirety of inner faces of the housing body 227.

By being disposed in the center portion 227 of the housing 220, the channel 226 is in thermal communication with banks of battery cells 230 disposed on both a right side of the channel 226 and a left side of the channel 226. Specifically, inner ends of the battery cells 230 of each bank 233, 234 are in thermal communication with the cooling channel 226 through the housing body 227. When in operation, coolant flowing through the battery cooling channel 226 absorbs heat from inner ends of the battery cells 230 on each lateral side of the battery cooling channel 226. The dielectric layers 248 of the modules 235 electrically insulate the housing body 227, while permitting heating to flow from the battery cells 230 to the coolant in the cooling channel 226.

Returning to FIGS. 15 to 17, the battery pack 210 also includes a global battery management system (global BMS) 240 disposed in the left chamber 225, connected to the housing body 227. The global BMS 240 is electrically connected to the PCBs 245 and the module BMS 243 of each module 235 via the bus bars 237. A plurality of communication wires 238 are also included to communicatively connect the global BMS 240 to each of the PCBs 245 and the corresponding module BMS 243. It is contemplated that the individual BMSs included in each PCB 245 could be omitted in some embodiments, with management of each module 235 being managed by the global BMS 240.

The battery pack 210 further includes a DC-DC converter 242 disposed in the left chamber 225. The DC-DC converter 242 is electrically connected to battery modules 235, via the global BMS 240, in order to receive electricity therefrom. The DC-DC converter 242 is arranged to provide power from the battery cells 230 to different electrical components of the vehicle 100 (other than the motor 160) that operate at a lower voltage. In the present embodiment, the DC-DC converter 242 provides power to the front and rear lights 145, 147 and the pump 278, as well as on-board control units (not shown). It is contemplated that the DC-DC converter 242 could manage power flow from the battery cells 230 to other electronic components of the vehicle 100, including but not limited to: a dashboard display and a sound system.

For ease of assembly and efficiency of space utilization, the global BMS 240 and the DC-DC converter 242 are disposed in an interior of the battery housing 220, although the placement could vary in different embodiments. As can be seen from at least FIGS. 15 and 16, the global BMS 240 and the DC-DC converter 242 are disposed in the battery pack 210 above the modules 235 of the left bank 233. The global BMS 240 and the DC-DC converter 242 occupy a volume within the housing 220 of approximately the same footprint as a battery module 235. The housing 220 is generally sized and shaped for receiving eight battery modules 235; in the present embodiment, the global BMS 240 and the DC-DC converter 242, in combination with the inverter 260 mounted outside the housing 220 but within generally the same footprint, thus occupy the space within the housing 220 of an “eighth module” which is omitted.

Figure 21:
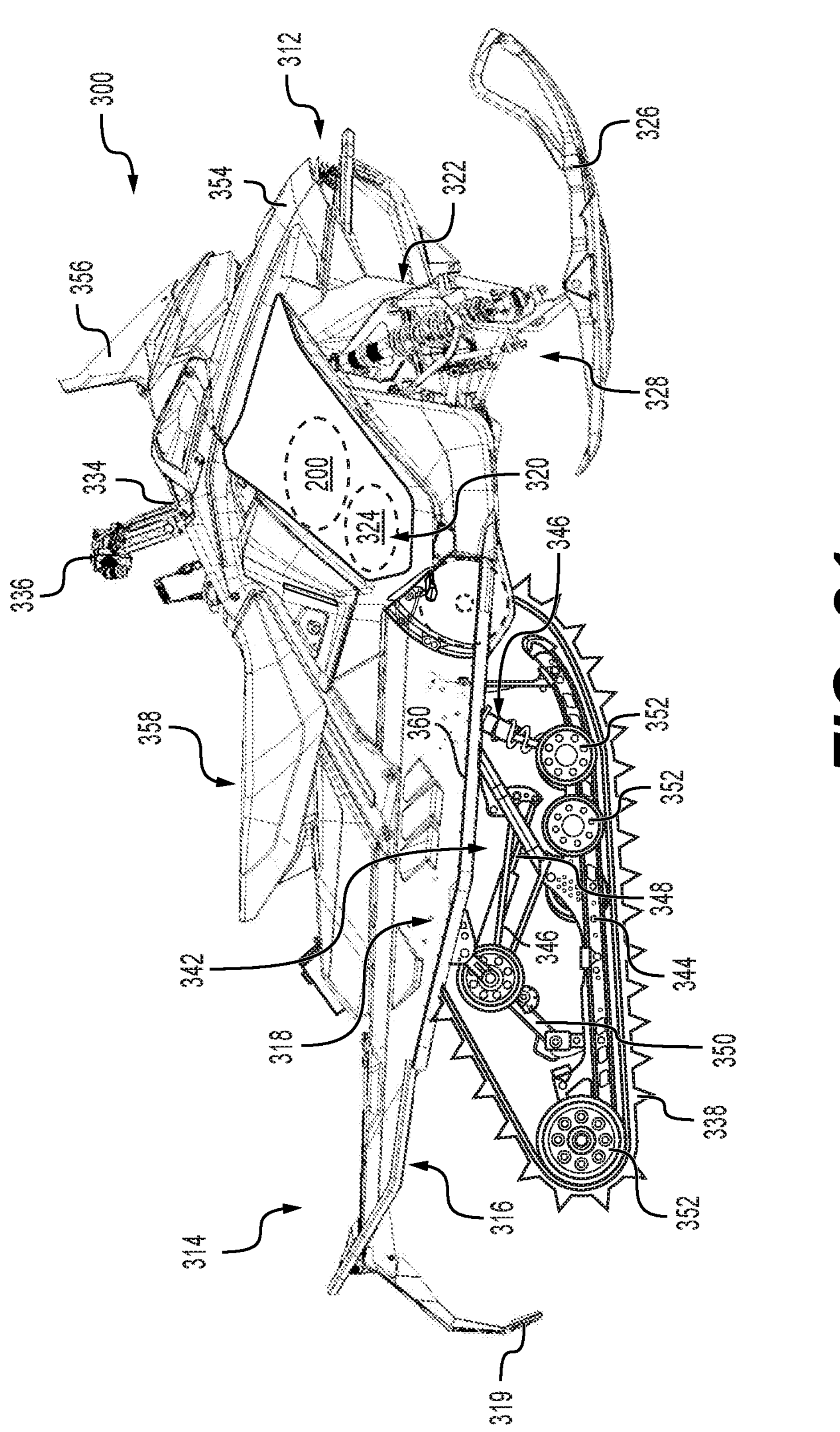
FIG. 21 is a right side elevation view of an electric snowmobile according to another non-limiting embodiment of the present technology.

With reference to FIG. 21, another non-limiting embodiment of a vehicle utilizes the powerpack 200 described above, specifically an electric snowmobile 300. The snowmobile 300 includes a forward end 312 and a rearward end 314 that are defined consistently with a forward travel direction of the snowmobile 300. The snowmobile 300 includes a frame 316 that includes a tunnel 318, a motor cradle portion 320 and a front suspension assembly portion 322.

The snowmobile 300 includes the powerpack 200 (shown schematically) and an electric motor 324 (shown schematically), carried by the motor cradle portion 320 of the frame 316. Two skis 326 (a right ski 326 being illustrated) are positioned at the forward end 312 of the snowmobile 300 and are attached to the front suspension assembly portion 322 of the frame 316 through front suspension assemblies 328. A steering device in the form of handlebar 336 is attached to the upper end of the steering column 334 to allow a driver to rotate the skis 326, in order to steer the snowmobile 300.

An endless drive track 338 is disposed generally under the tunnel 318 and is operatively connected to the motor 324. The endless drive track 338 is driven to run about a rear suspension assembly 342 for propulsion of the snowmobile 300. The rear suspension assembly 342 includes a pair of slide rails 344 in sliding contact with the endless drive track 338. The rear suspension assembly 342 also includes a plurality of shock absorbers 346. Suspension arms 348 and 350 are provided to attach the slide rails 344 to the frame 316. A plurality of idler wheels 352 are also provided in the rear suspension assembly 342. Other types and geometries of rear suspension assemblies are also contemplated.

At the forward end 312 of the snowmobile 300, fairings 354 enclose the powerpack 200. The fairings 354 include a hood and one or more side panels that can be opened to allow access to the powerpack 200 and/or the motor 324 when this is required, for example, for inspection or maintenance of the powerpack 200 and/or the motor 324. A windshield 356 is connected to the fairings 354 near the forward end 312 of the snowmobile 300. Alternatively, the windshield 356 could be connected directly to the handlebar 336. The windshield 356 acts as a wind screen to lessen the force of the air on the driver while the snowmobile 300 is moving forward.

A straddle seat 358 is positioned over the tunnel 318. Two footrests 360 are positioned on opposite sides of the snowmobile 300 below the seat 358 to accommodate the driver's feet. A snow flap 319 is disposed at the rear end 314 of the snowmobile 300. The tunnel 318 consists of one or more pieces of sheet metal arranged to form an inverted U-shape that is connected at the front to the motor cradle portion 320 and extends rearward therefrom.

The snowmobile 300 has other features and components which would be readily recognized by one of ordinary skill in the art, further explanation and description of these components will not be provided herein.

The vehicles 100, 300 implemented in accordance with some non-limiting implementations of the present technology can be represented as follows, presented in numbered clauses.

CLAUSE 1. A straddle seat electric vehicle (100, 300) comprising:

a frame (110);

a straddle seat (140) supported by the frame (110);

at least one ground-engaging member (121, 127) operatively connected to the frame (110);

an electric motor (160) being operatively connected to the at least one ground-engaging member (121, 127) for driving the at least one ground-engaging member (121, 127);

an electric powerpack (200) operatively connected to the electric motor (160), the powerpack (200) comprising:

a battery pack (210) comprising:

a battery housing (220) including:

a housing body (227), a cooling channel (226) defined in the housing body (227), the cooling channel (226) extending generally vertically through a center portion of the housing body (227), a first cover (221) selectively connected to the housing body (227), and a second cover (223) selectively connected to the housing body (227);

a first plurality of cylindrical battery cells (230) disposed in a first chamber (225) defined by the housing (220) laterally between the cooling channel (226) and the first cover (221), each battery cell (230) of the first plurality of battery cells (230) extending generally orthogonally to the cooling channel (226) and the first cover (221);

at least one first current collector (245) disposed laterally between the first cover (221) and the first plurality of battery cells (230), the at least one first current collector (245) being electrically connected to the first plurality of battery cells (230), the first cover (221) enclosing the at least one first current collector (245) and outer ends of the battery cells (230) of the first plurality of battery cells (230), the first cover (221) being electrically insulated from the at least one first current collector (245);

a second plurality of cylindrical battery cells (230) disposed in a second chamber (229) defined by the housing laterally between the cooling channel (226) and the second cover (223), each battery cell of the second plurality of battery cells (230) extending generally orthogonally to the cooling channel (226) and the second cover (223); and at least one second current collector (245) disposed laterally between the second cover (223) and the second plurality of battery cells (230), the at least one second current collector (245) being electrically connected to the second plurality of battery cells (230), the second cover (223) enclosing the at least one second current collector (245) and outer ends of the battery cells (230) of the second plurality of battery cells (230), the second cover (223) being electrically insulated from the at least one second current collector (245).

CLAUSE 2. The vehicle (100, 300) of clause 1, wherein:

the battery cells (230) of the first plurality of battery cells (230) are separated into a first plurality of battery modules (235);

the at least one first current collector (245) includes a first plurality of current collectors (245) connected in series;

each one of the first plurality of current collectors (245) is electrically connected to a corresponding battery module (235) of the first plurality of battery modules (235);

the battery cells (230) of the second plurality of battery cells (230) is separated into a second plurality of battery modules (235);

the at least one second current collector (245) includes a second plurality of current collectors (245) connected in series; and each one of the second plurality of current collectors (245) is electrically connected to a corresponding battery module (235) of the second plurality of battery modules (235).

CLAUSE 3. The vehicle (100, 300) of clause 2, wherein the second plurality of battery modules (235) has a greater number of battery modules (235) than the first plurality of battery modules (235).

CLAUSE 4. The vehicle (100, 300) of clause 3, wherein:

the first plurality of battery modules (235) includes three first battery modules (235) disposed in the first chamber (225);

the first plurality of current collectors (245) includes three first current collectors (245);

the second plurality of battery modules (235) includes four second battery modules (235) disposed in the second chamber (229); and the second plurality of current collectors (245) includes four second current collectors (245).

CLAUSE 5. The vehicle (100, 300) of clause 4, wherein:

the three first current collectors (245) are electrically connected to one another in series; and the four second current collectors (245) are electrically connected to one another in series.

CLAUSE 6. The vehicle (100, 300) of clause 2, wherein:

the first plurality of current collectors (245) is a first plurality of printed circuit boards (PCBs) (245); and the second plurality of current collectors (245) is a second plurality of PCBs (245).

CLAUSE 7. The vehicle (100, 300) of clause 6, wherein each PCB (245) of the first and second pluralities of PCBs (245) includes a module battery management system (BMS) (243) for managing the corresponding battery module (235) of the first and second pluralities of battery modules (235).

CLAUSE 8. The vehicle (100, 300) of clause 3, wherein the battery pack (210) further comprises at least one of:

a global BMS (240) disposed in the first chamber (225), the global BMS (240) being electrically connected to the at least one first current collector (245) and the at least one second current collector (245); and a DC-DC converter (242) disposed in the first chamber (225), the DC-DC converter (242) being electrically connected to at least one of the at least one first current collector (245) and the at least one second current collector (245).

CLAUSE 9. The vehicle (100, 300) of any one of clauses 1 to 8, wherein:

the electric powerpack (200) further comprises a plurality of electrical components;

at least one of the plurality of electrical components being electrically connected to the first and second pluralities of cylindrical battery cells (230) and disposed on an exterior of the battery housing (220); and at least one other of the plurality of electrical components being electrically connected to the first and second pluralities of cylindrical battery cells (230) and disposed on an interior of the battery housing (220).

CLAUSE 10. The vehicle (100, 300) of any one of clauses 1 to 9, wherein the electric powerpack (200) further comprises at least one of:

a charger (250) electrically connected to the first and second pluralities of cylindrical battery cells (230); and an inverter (260) electrically connected to the first and second pluralities of cylindrical battery cells (230).

CLAUSE 11. The vehicle (100, 300) of clause 10, wherein the electric powerpack (200) comprises both the charger (250) and the inverter (260).

CLAUSE 12. The vehicle (100, 300) of clause 11, wherein the charger (250) and the inverter (260) are mounted to the battery housing (220).

CLAUSE 13. The vehicle (100, 300) of any one of clauses 1 to 12, wherein:

the housing body (227) includes:

a first lateral portion (227A), and a second lateral portion (227B) connected to the first lateral portion (227A);

the first cover (221) being selectively connected to the first lateral portion (227A);

the second cover (223) being selectively connected to the second lateral portion (227B);

an inner face of the first lateral portion (227A) including a first channel form (226A);

an inner face of the second lateral portion (227B) including a second channel form (226B);

the cooling channel (226) is defined by a space created between the inner face of the first lateral portion (227A) and the inner face of the second lateral portion (227B); and the center portion of the housing body (227) being formed by an inner part of the first lateral portion (227A) and an inner part of the second lateral portion (227B).

CLAUSE 14. The vehicle (100, 300) of any one of clauses 1 to 13, wherein the battery pack (210) further comprises:

at least one first dielectric layer (248) disposed between inner ends of the first plurality of battery cells (230) and the center portion the housing body (227); and at least one second dielectric layer (248) disposed between inner ends of the second plurality of battery cells (230) and the center portion the housing body (227).

CLAUSE 15. The vehicle (100, 300) of any one of clauses 1 to 14, wherein, when in operation, coolant flowing through the cooling channel (226) absorbs heat from inner ends of the first plurality of battery cells (230) and inner ends of the second plurality of battery cells (230).

CLAUSE 16. The vehicle (100, 300) of any one of clauses 1 to 15, wherein:

inner ends of the first plurality of battery cells (230) are in thermal communication with the cooling channel (226) through the housing body (227); and inner ends of the second plurality of battery cells (230) are in thermal communication with the cooling channel (226) through the housing body (227).

CLAUSE 17. The vehicle (100, 300) of any one of clauses 1 to 16, further comprising a liquid cooling system including:

a fluid pump (278);

a coolant reservoir (270); and a cooling circuit (290) formed at least in part by the cooling channel (226) of the battery housing (220), the cooling channel (226) being fluidly connected to the fluid pump (278) and the coolant reservoir (270).

CLAUSE 18. The vehicle (100, 300) of any one of clauses 1 to 17, wherein:

the at least one ground-engaging member (121, 127) includes:

a front wheel (121) disposed at least in part forward of the powerpack (200), and a rear wheel (127) disposed at least in part rearward of the powerpack (200); and the vehicle (100) is an electric motorcycle (100).

CLAUSE 19. The vehicle (100, 300) of any one of clauses 1 to 18, wherein:

the vehicle (100, 300) is an electric snowmobile (300); and the at least one ground-engaging member includes two skis (326).

CLAUSE 20. A straddle seat electric vehicle (100, 300) comprising:

a frame (110);

a straddle seat (140) supported by the frame (110);

at least one ground-engaging member (121, 127) operatively connected to the frame (110);

an electric motor (160) being operatively connected to the at least one ground-engaging member (121, 127) for driving the at least one ground-engaging member (121, 127);

an electric powerpack (200) operatively connected to the electric motor (160), the powerpack (200) comprising:

a battery pack (210) comprising:

a battery housing (220) including:

a housing body (227), a cooling channel (226) defined in the housing body (227), the cooling channel (226) extending generally vertically through a center portion of the housing body (227), a first cover (221) selectively connected to the housing body (227), and a second cover (223) selectively connected to the housing body (227);

a first plurality of battery modules (235) disposed in a first chamber (225) defined by the housing laterally between the cooling channel (226) and the first cover (221), each module (235) of the first plurality of battery modules (235) including a plurality of battery cells (230);

a plurality of first current collectors (245) disposed laterally between the first cover (221) and the first plurality of battery modules (235), each battery module (235) of the first plurality of battery modules (235) being operatively connected to a corresponding one of the first plurality of current collectors (245), the plurality of battery cells (230) of each battery module (235) of the first plurality of battery modules (235) being connected together in series by the corresponding one of the first plurality of current collectors (245);

a second plurality of battery modules (235) disposed in a second chamber (229) defined by the housing laterally between the cooling channel (226) and the second cover (223), each module (235) of the second plurality of battery modules (235) including a plurality of battery cells (230); and a plurality of second current collectors (245) disposed laterally between the second cover (223) and the second plurality of battery modules (235), each battery module (235) of the second plurality of battery modules (235) being operatively connected to a corresponding one of the second plurality of current collectors (245), the plurality of battery cells (230) of each battery module (235) of the second plurality of battery modules (235) being connected together in series by the corresponding one of the second plurality of current collectors (245).

CLAUSE 21: A battery pack for an electric vehicle, the battery pack comprising:

a battery housing;

a general battery management system (general BMS) disposed in the battery housing; and a plurality of battery modules disposed in the battery housing, each battery module of the plurality of battery modules comprising:

a plurality of battery cells; and a module board comprising:

a module battery management system (module BMS) communicatively connected to the general BMS, the module BMS including at least one sensor for sensing at least one operating condition of the plurality of battery cells; and an integrated current collector disposed within the battery module, the integrated current collector electrically coupling the plurality of battery cells together.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A straddle seat electric vehicle comprising:

a frame;

a straddle seat supported by the frame;

at least one ground-engaging member operatively connected to the frame;

an electric motor being operatively connected to the at least one ground-engaging member for driving the at least one ground-engaging member;

an electric powerpack operatively connected to the electric motor, the powerpack comprising:

a battery pack comprising:

a battery housing including:

a housing body, a cooling channel defined in the housing body, the cooling channel extending generally vertically through a center portion of the housing body, a first cover selectively connected to the housing body, and a second cover selectively connected to the housing body;

a first plurality of cylindrical battery cells disposed in a first chamber defined by the battery housing laterally between the cooling channel and the first cover, each battery cell of the first plurality of battery cells extending generally orthogonally to the cooling channel and the first cover;

at least one first current collector disposed laterally between the first cover and the first plurality of battery cells, the at least one first current collector being electrically connected to the first plurality of battery cells, the first cover enclosing the at least one first current collector and outer ends of the battery cells of the first plurality of battery cells, the first cover being electrically insulated from the at least one first current collector;

a second plurality of cylindrical battery cells disposed in a second chamber defined by the battery housing laterally between the cooling channel and the second cover, each battery cell of the second plurality of battery cells extending generally orthogonally to the cooling channel and the second cover; and at least one second current collector disposed laterally between the second cover and the second plurality of battery cells, the at least one second current collector being electrically connected to the second plurality of battery cells, the second cover enclosing the at least one second current collector and outer ends of the battery cells of the second plurality of battery cells, the second cover being electrically insulated from the at least one second current collector.

2. The vehicle of claim 1, wherein:

the battery cells of the first plurality of battery cells are separated into a first plurality of battery modules;

the at least one first current collector includes a first plurality of current collectors connected in series;

each one of the first plurality of current collectors is electrically connected to a corresponding battery module of the first plurality of battery modules;

the battery cells of the second plurality of battery cells is separated into a second plurality of battery modules;

the at least one second current collector includes a second plurality of current collectors connected in series; and each one of the second plurality of current collectors is electrically connected to a corresponding battery module of the second plurality of battery modules.

3. The vehicle of claim 2, wherein the second plurality of battery modules has a greater number of battery modules than the first plurality of battery modules.

4. The vehicle of claim 3, wherein:

the first plurality of battery modules includes three first battery modules disposed in the first chamber;

the first plurality of current collectors includes three first current collectors;

the second plurality of battery modules includes four second battery modules disposed in the second chamber; and the second plurality of current collectors includes four second current collectors.

5. The vehicle of claim 4, wherein:
the three first current collectors are electrically connected to one another in series; and
the four second current collectors are electrically connected to one another in series.

6. The vehicle of claim 2, wherein:
the first plurality of current collectors is a first plurality of printed circuit boards (PCBs); and
the second plurality of current collectors is a second plurality of PCBs.

7. The vehicle of claim 6, wherein each PCB of the first and second pluralities of PCBs includes a module battery management system (BMS) for managing the corresponding battery module of the first and second pluralities of battery modules.

8. The vehicle of claim 3, wherein the battery pack further comprises at least one of:
a global BMS disposed in the first chamber, the global BMS being electrically connected to the at least one first current collector and the at least one second current collector; and
a DC-DC converter disposed in the first chamber, the DC-DC converter being electrically connected to at least one of the at least one first current collector and the at least one second current collector.

9. The vehicle of claim 1, wherein:
the electric powerpack further comprises a plurality of electrical components;
at least one of the plurality of electrical components being electrically connected to the first and second pluralities of cylindrical battery cells and disposed on an exterior of the battery housing; and
at least one other of the plurality of electrical components being electrically connected to the first and second pluralities of cylindrical battery cells and disposed on an interior of the battery housing.

10. The vehicle of claim 1, wherein the electric powerpack further comprises at least one of:
a charger electrically connected to the first and second pluralities of cylindrical battery cells; and
an inverter electrically connected to the first and second pluralities of cylindrical battery cells.

11. The vehicle of claim 10, wherein the electric powerpack comprises both the charger and the inverter.

12. The vehicle of claim 11, wherein the charger and the inverter are mounted to the battery housing.

13. The vehicle of claim 1, wherein:
the housing body includes:
a first lateral portion, and
a second lateral portion connected to the first lateral portion;
the first cover being selectively connected to the first lateral portion;
the second cover being selectively connected to the second lateral portion;
an inner face of the first lateral portion including a first channel form;
an inner face of the second lateral portion including a second channel form;
the cooling channel is defined by a space created between the inner face of the first lateral portion and the inner face of the second lateral portion; and
the center portion of the housing body being formed by an inner part of the first lateral portion and an inner part of the second lateral portion.

14. The vehicle of claim 1, wherein the battery pack further comprises:
at least one first dielectric layer disposed between inner ends of the first plurality of battery cells and the center portion the housing body; and
at least one second dielectric layer disposed between inner ends of the second plurality of battery cells and the center portion the housing body.

15. The vehicle of claim 1, wherein, when in operation, coolant flowing through the cooling channel absorbs heat from inner ends of the first plurality of battery cells and inner ends of the second plurality of battery cells.

16. The vehicle of claim 1, wherein:
inner ends of the first plurality of battery cells are in thermal communication with the cooling channel through the housing body; and
inner ends of the second plurality of battery cells are in thermal communication with the cooling channel through the housing body.

17. The vehicle of claim 1, further comprising a liquid cooling system including:
a fluid pump;
a coolant reservoir; and
a cooling circuit formed at least in part by the cooling channel of the battery housing, the cooling channel being fluidly connected to the fluid pump and the coolant reservoir.

18. The vehicle of claim 1, wherein:
the at least one ground-engaging member includes:
a front wheel disposed at least in part forward of the powerpack, and
a rear wheel disposed at least in part rearward of the powerpack; and
the vehicle is an electric motorcycle.

19. The vehicle of claim 1, wherein:
the vehicle is an electric snowmobile; and
the at least one ground-engaging member includes two skis.

20. A straddle seat electric vehicle comprising:
a frame;
a straddle seat supported by the frame;
at least one ground-engaging member operatively connected to the frame;
an electric motor being operatively connected to the at least one ground-engaging member for driving the at least one ground-engaging member;
an electric powerpack operatively connected to the electric motor, the powerpack comprising:
a battery pack comprising:
a battery housing including:
a housing body,
a cooling channel defined in the housing body, the cooling channel extending generally vertically through a center portion of the housing body,
a first cover selectively connected to the housing body, and
a second cover selectively connected to the housing body;
a first plurality of battery modules disposed in a first chamber defined by the housing laterally between the cooling channel and the first cover, each module of the first plurality of battery modules including a plurality of battery cells;
a plurality of first current collectors disposed laterally between the first cover and the first plurality of battery modules, each battery module of the first plurality of battery modules being operatively connected to a corresponding one of the first plurality of current collectors, the plurality of battery cells of each battery module of the first plurality of battery modules being connected together in series by the corresponding one of the first plurality of current collectors;

a second plurality of battery modules disposed in a second chamber defined by the housing laterally between the cooling channel and the second cover, each module of the second plurality of battery modules including a plurality of battery cells; and a plurality of second current collectors disposed laterally between the second cover and the second plurality of battery modules, each battery module of the second plurality of battery modules being operatively connected to a corresponding one of the second plurality of current collectors, the plurality of battery cells of each battery module of the second plurality of battery modules being connected together in series by the corresponding one of the second plurality of current collectors.

* * * * *